United States Patent
Li

(10) Patent No.: US 11,553,019 B2
(45) Date of Patent: Jan. 10, 2023

(54) METHOD, APPARATUS, ELECTRONIC DEVICE AND STORAGE MEDIUM FOR ACQUIRING PROGRAMS IN LIVE STREAMING ROOM

(71) Applicant: BEIJING DAJIA INTERNET INFORMATION TECHNOLOGY CO., LTD., Beijing (CN)

(72) Inventor: Ji Li, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/225,512

(22) Filed: Apr. 8, 2021

(65) Prior Publication Data
US 2021/0329047 A1  Oct. 21, 2021

(30) Foreign Application Priority Data
Apr. 17, 2020  (CN) .......................... 202010307368.8

(51) Int. Cl.
| H04L 65/612 | (2022.01) |
| H04L 67/141 | (2022.01) |
| H04L 67/306 | (2022.01) |
| H04L 65/402 | (2022.01) |
| H04L 67/54 | (2022.01) |

(52) U.S. Cl.
CPC ........ H04L 65/612 (2022.05); H04L 65/4025 (2022.05); H04L 67/141 (2013.01); H04L 67/306 (2013.01); H04L 67/54 (2022.05)

(58) Field of Classification Search
CPC ............. H04L 65/4084; H04L 65/4023; H04L 67/141; H04L 67/24; H04L 67/306; H04L 65/612; H04L 67/54; H04L 65/4025
See application file for complete search history.

(56) References Cited

U.S. PATENT DOCUMENTS

| 10,771,524 B1 * | 9/2020 | Long .................... H04L 67/104 |
| 2002/0016848 A1 * | 2/2002 | Yoshimine .......... H04L 67/2819 |
| | | 707/E17.116 |

(Continued)

FOREIGN PATENT DOCUMENTS

| CN | 1635792 A | 7/2005 |
| CN | 106937129 A | 7/2017 |

(Continued)

OTHER PUBLICATIONS

Chinese Office Action dated Aug. 27, 2021, from application No. 202010307368.8, 22 Pages.

(Continued)

Primary Examiner — Wing F Chan
Assistant Examiner — Billy H Ng
(74) Attorney, Agent, or Firm — Foley & Lardner LLP

(57) ABSTRACT

The disclosure relates to methods, apparatuses, electronic devices, and storage media for acquiring programs in a live streaming room. The method includes acquiring a program acquisition condition and triggering to save live streaming room data of a user account as a target program in response to detecting that a live streaming behavior of the user account meets the program acquisition condition, to provide the target program to an associated user account of the user account.

18 Claims, 7 Drawing Sheets

(56) References Cited

U.S. PATENT DOCUMENTS

2009/0313382 A1* 12/2009 Bouazizi ............ H04N 21/6587
                                                         709/234
2012/0006891 A1    1/2012 Zhou et al.
2015/0281887 A1   10/2015 Johnson et al.

FOREIGN PATENT DOCUMENTS

| CN | 107292944 A | 10/2017 |
| CN | 107948668 A | 4/2018 |
| CN | 108540854 A | 9/2018 |
| CN | 108737884 A | 11/2018 |
| CN | 109045708 A | 12/2018 |
| CN | 109194978 A | 1/2019 |
| CN | 110703976 A | 1/2020 |

OTHER PUBLICATIONS

Chinese Office Action dated Jan. 6, 2022, from application No. 202010307368.8, 17 pages.
Chinese Office Action dated Mar. 22, 2022, from application No. 202010307368.8, 9 pages.

* cited by examiner

METHOD, APPARATUS, ELECTRONIC DEVICE AND STORAGE MEDIUM FOR ACQUIRING PROGRAMS IN LIVE STREAMING ROOM

CROSS-REFERENCE TO RELATED APPLICATIONS

This application is based upon and claims priority to Chinese Patent Application No. 202010307368.8, filed Apr. 17, 2020, the entirety of which is incorporated herein by reference.

TECHNICAL FIELD

The disclosure relates to the field of webcast, and in particular to methods, apparatuses, electronic devices, and storage media for acquiring programs in a live streaming room.

BACKGROUND

Nowadays, webcast, such as live shopping, live performances, live teaching, industry exhibitions, or the like is gradually integrated into in work and life of users. Users with associated user accounts can easily participate in rich, real-time live streaming interactions, to satisfy their demand for live interaction.

However, due to high real-time and high participation of interaction in the live streaming room, it is often difficult for users to predict moments when highlights in the live streaming content will appear during the interaction in the live streaming room In that regard, the users may not have the opportunity to save live streaming room data corresponding to the highlights in time, which greatly affects the interactive experience of users and their associated users in the live streaming room.

SUMMARY

The disclosure provides methods, apparatuses, electronic devices, and storage media for acquiring programs in a live streaming room.

According to some arrangements, a method for acquiring programs in a live streaming room includes acquiring a program acquisition condition and triggering to save live streaming room data of a user account as a target program in response to detecting that a live streaming behavior of the user account meets the program acquisition condition, to provide the target program to an associated user account of the user account.

According to some arrangements, a method for acquiring programs in a live streaming room includes acquiring a program acquisition condition and sending a program acquisition instruction to an associated user account of a user account in response to detecting that a live streaming behavior of the user account meets the program acquisition condition. The program acquisition instruction is used to trigger the associated user account to save live streaming room data of the user account as the target program.

According to some arrangements, an apparatus for acquiring programs in a live streaming room includes a first condition acquiring module, configured to acquire a program acquisition condition, and an acquisition triggering module, configured to trigger to save live streaming room data of a user account as a target program in response to detecting that a live streaming behavior of the user account meets the program acquisition condition, to provide the target program to an associated user account of the user account.

According to some arrangements, an apparatus for acquiring programs in a live streaming room includes a second condition acquiring module, configured to acquire a program acquisition condition and an acquisition instruction sending module, configured to send a program acquisition instruction to an associated user account of a user account in response to detecting that a live streaming behavior of the user account meets the program acquisition condition. The program acquisition instruction is used to trigger the associated user account to save live streaming room data of the user account as the target program.

According to some arrangements, a client includes a processor and a memory for storing executable instructions of the processor. The processor is configured to execute the instructions to implement the method for acquiring programs in a live streaming room according to the first aspect.

According to some arrangements, a server includes a processor and a memory for storing executable instructions of the processor. The processor is configured to execute the instructions to implement the method for acquiring programs in a live streaming room according to the second aspect.

According to some arrangements, a system for acquiring programs in a live streaming room includes the client described herein and the server described herein.

According to some arrangements, instructions in the storage medium, when executed by a processor of an electronic device, enables the electronic device to execute the method for acquiring programs in a live streaming room as described herein.

It should be understood that the above general description and the following detailed description are only example and explanatory, and cannot limit the disclosure.

BRIEF DESCRIPTION OF THE DRAWINGS

The drawings herein are incorporated into the specification and constitute a part of the specification, show arrangements conforming to the disclosure, and are used to explain the principle of the disclosure together with the specification, and do not constitute an improper limitation of the disclosure.

DETAILED DESCRIPTION

In order to enable those of ordinary skill in the art to better understand technical solutions of the disclosure, the technical solutions in the arrangements of the disclosure will be described clearly and completely with reference to the accompanying drawings.

It should be noted that the terms "first" and "second" in the specification and claims of the disclosure and the above-mentioned drawings are used to distinguish similar objects, and not necessarily used to describe a specific order or sequence. It should be understood that the data used in this way can be interchanged under appropriate circumstances, so that the arrangements of the disclosure described herein can be implemented in an order other than that illustrated or described herein. The implementations described in the following example arrangements do not represent all implementations consistent with the disclosure. Rather, they are only examples of apparatuses and methods consistent with some aspects of the disclosure as detailed in the appended claims.

Figure 1:
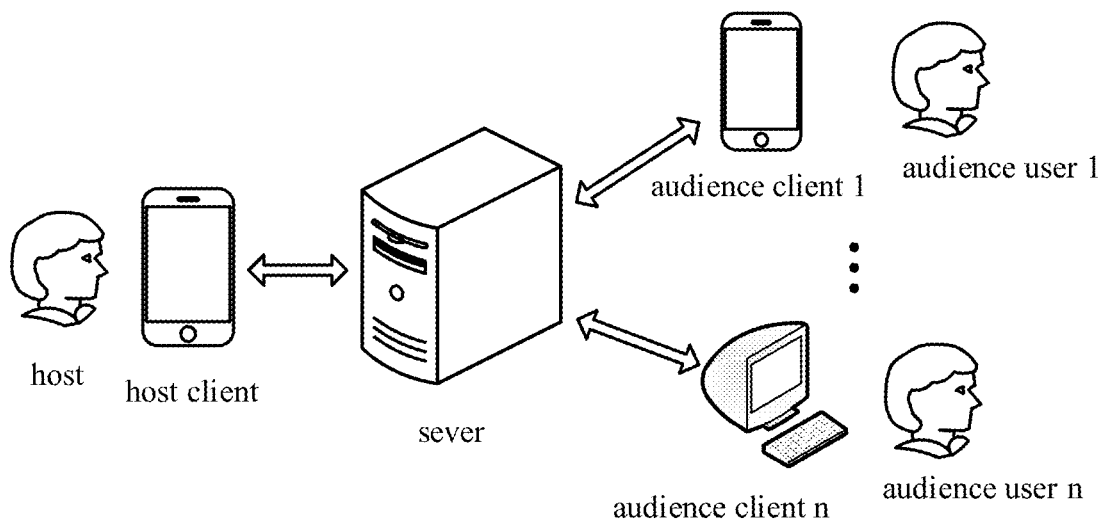
FIG. 1 is a schematic diagram of a webcast system according to some arrangements of the disclosure.

In a webcast system shown in FIG. 1, a user account uploads a live streaming program to a server in a live streaming room through a user account client. The server distributes the live streaming program to associated user account clients used by one or more associated user account users who enter the live streaming room. Each associated user account client displays the received live streaming program to the user, thus realizing the live streaming of the program. The server described in the arrangement of the disclosure may be a personal computer, an industrial computer, an industrial personal computer, or other network devices capable of providing a webcast service for a client. The client can be an application installed in a terminal or an application of a web version integrated in a browser. The terminal can be a mobile phone, a tablet, a wearable device, a personal computer, a personal digital assistant, a cloud computing device, or other electronic devices. The live streaming programs described in arrangements of the disclosure may be pure audio programs, pure video programs, video programs containing audio signals, or immersive programs containing other identifiable signals such as gravity, light, heat, etc., and the disclosure does not limit this.

In addition, during implementation of the solution of the disclosure, the client installed in the terminal may or may not play live streaming programs. For example, the client may save the above live streaming programs in the background running state, or the client may add a monitoring process related to the above live streaming program in the system. In response to determining a saving condition is met, the system calls the client to save the above live streaming program. In order to describe the technical solution of the disclosure concisely and clearly, in the following explanatory sentences, the above-mentioned associated user account client that is playing the current live streaming program, and the associated user account client that does not play the current live streaming program but has the above-mentioned association relationship with the live streaming program are collectively referred to as associated clients.

In addition, it should be noted that the user account involved in the disclosed solutions can be understood as the user corresponding to the user account according to the contextual meaning, and the associated user account can be understood as the user corresponding to the associated user account according to the contextual meaning, and both the user account and the associated user account are actual persons rather than simple accounts.

Figure 2:
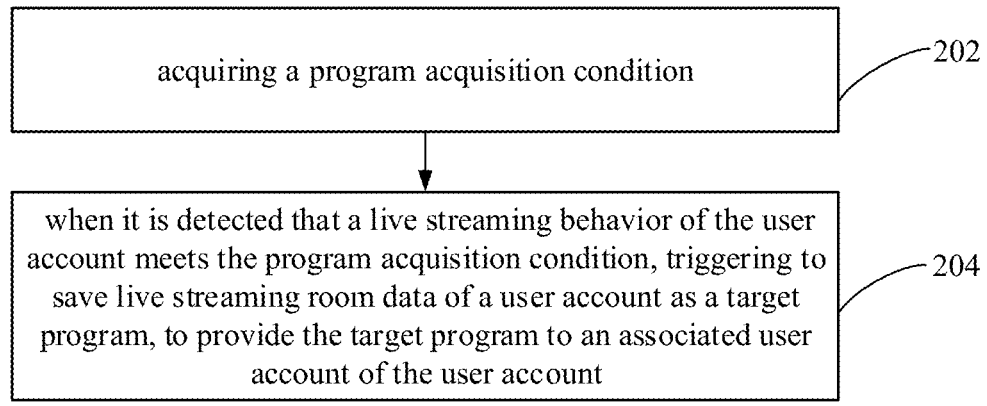
FIG. 2 is a flowchart of a method for acquiring programs in a live streaming room according to some arrangements of the disclosure.

FIG. 2 is a flowchart of a method for acquiring programs in a live streaming room according to one of the example arrangements of the disclosure. The method is applied to a user account client and includes following steps.

In block 202, a program acquisition condition is acquired.

First of all, it needs to be explained that the user account involved in the disclosed solutions can be the user account corresponding to the live streaming room, and the associated account of the user account can be the associated user account in the live streaming room, the fan user account of the user account, and other accounts who follow the program tag corresponding to the current live streaming program in the live streaming room and/or other accounts located in the same geographic area as the user account, or the like.

In an arrangement, the condition setting instruction issued by the user account or the associated user account of the user account is received, and then the program acquisition condition is determined according to the condition setting instruction. In the case where the above-mentioned condition setting instruction is issued by the user account, the determined program acquisition condition may be applied to the current live streaming program or all live streaming programs broadcast by the user account. The above-mentioned program acquisition conditions are set by the user account, so that the program acquisition conditions are more in line with the live streaming habits of the user account, and it is convenient to improve the judgment accuracy of the condition matching situation. In the case where the above condition setting instruction is issued by the associated user account, the determined program acquisition conditions can be applied to the current live streaming program, all live streaming programs broadcast by the user account, or all live streaming programs played by the associated user account. The above-mentioned program acquisition conditions are set by the associated user account, so that the program acquisition conditions are more in line with the personal habits and wishes of the associated user account user, and are more humane.

In block 204, it is triggered to save live streaming room data of a user account as a target program in response to detecting that a live streaming behavior of the user account meets the program acquisition condition, to provide the target program to an associated user account of the user account.

In an arrangement, the live streaming behavior of the user account may include a live streaming voice, so that in response to detecting that the live streaming voice of the user account meets the program acquisition condition, it can be determined that the detected live streaming behavior of the user account meets the program acquisition condition. By detecting the live streaming voice of the user account to determine whether it meets the program acquisition condition, the user account is allowed to control the start and stop of the data acquisition in the live streaming room through the voice during the live streaming. During the live streaming, the user account (which is actually the user corresponding to the user account) is not required to perform manual operations, and wonderful live streaming contents can be automatically identified and the corresponding live streaming room data are saved as the target program, so that users can interact more conveniently and efficiently in the live streaming room.

In an arrangement, the live streaming behavior of the user account may include a live streaming action, so that in response to detecting that the live streaming action of the user account meets the program acquisition condition, it can be determined that the live streaming action of the user account meets the program acquisition condition. By detecting the live streaming action of the user account to determine whether it meets the program acquisition condition, it allows the user account to directly control the start and stop of the data acquisition in the live streaming room through limbs and body movements, gestures, facial expressions and other actions during the live streaming, without manual operations of the user. In the live streaming process, not only manual operations of the user are not required, but also it can more accurately determine the program acquisition intention of the live streaming user than through the voice, which improves the judgment accuracy of condition matching to a certain extent.

In one arrangement, the above-mentioned program acquisition condition includes a program acquisition start condition and a program acquisition end condition. During the live streaming process, if it is detected that the live streaming behavior of the user account meets the program acquisition start conditions, it triggers to start saving the live streaming room data of the user account as the target program; if it is detected that the live streaming behavior of the user account meets the program acquisition end condition, it triggers to stop saving the live streaming room data of the user account as the target program. Detecting that the live streaming behavior of the user account meets the program acquisition start condition corresponds to the start time in response to determining that the live streaming room data is saved as the target program, and detecting that the live streaming behavior of the user account meets the program acquisition end condition corresponds to the end time in response to determining that the live streaming room data is saved as the target program. During the live streaming process, the live streaming start time and live streaming end time are respectively detected in real time, which is convenient for detecting the saving start time and end time of the live streaming room data in time, so as to accurately obtain the live streaming room data.

In one arrangement, in response to detecting that the live streaming behavior of the user account meets the program acquisition start condition and the associated client is playing the above-mentioned live streaming program, the user account may send reminder information of start saving to the associated client, so that the associated user account knows that saving of the current live streaming room data has been started, and the associated client can also show a saving start confirmation option to the associated user, and start to save the above live streaming room data after receiving the confirmation instruction for this option, so that the associated user can decide whether to save the current live streaming program voluntarily when watching the live streaming program, so as to achieve a more flexible and diverse way of obtaining live streaming room data.

In one arrangement, it is triggered to serve any moment as a saving start moment to recalculate a storage duration of the live streaming room data, in response to detecting that the live streaming behavior meets the program acquisition start condition again at the any moment, after start of saving the live streaming room data is triggered. In the case that the user account makes multiple consecutive live streaming behaviors that meet the program acquisition start condition, the start time corresponding to the last live streaming behavior that meets the program acquisition condition is taken as the start saving time of acquiring the current live streaming program. In the case of the maximum saving duration is set, it can continue to save even if the current saved duration is close to the maximum saving duration, the interruption in the saving process is reduced to obtain more complete target programs, which avoids many short target programs and simplifies the corresponding processing operation of the target programs.

In an arrangement, a client corresponding to the user account may be triggered to save the live streaming room data of the user account as the target program; or, the program acquisition instruction is sent to a server, to trigger the server to save the live streaming room data of the user account as the target program; or, a program acquisition instruction is sent to the server, such that the server forwards the program acquisition instruction to the associated user account. The program acquisition instruction is used to trigger a client corresponding to the associated user account to save the live streaming room data of the user account as the target program. The client corresponding to the user account, the server, or the client corresponding to the associated user account can be triggered to save the live streaming room data as the target program according to actual conditions, so that it can adapt to multiple live streaming environments and enrich the applicable scenarios of solutions of the disclosure.

In one arrangement, after acquisition of live streaming room data is completed or other devices are triggered to complete acquisition of the live streaming room data, a target program configuration instruction issued by the user account may be received. The target program configuration instruction is used to instruct a client corresponding to the user account, a server, and/or a client corresponding to the associated user account to perform parameter configuration on the saved target program. That is, the target program configuration instruction is used to instruct a client corresponding to the user account, a server, a client corresponding to the associated user account, a client corresponding to the user account and a server, a client corresponding to the user account and a client corresponding to the associated user account, a server and a client corresponding to the associated user account, all of a client corresponding to the user account, a server and a client corresponding to the associated user account, to perform parameter configuration on the saved target program. The configured parameters may include file names, file classification labels, and/or voice introduction of the file, or the like. The user account can use the above target program configuration instructions to rename the target program saved by itself or other devices, add classification tags, add text or voice introduction and other additional information, so that the user account can set uniform target program parameters for the target programs saved by the same user account, and the user or associated users can clearly know relevant information of the saved target programs or classify, search and archive the target programs. At the same time, it is convenient for the server to accurately perform follow-up actions such as recommendation and sharing on the target program according to the above parameters of the target program.

In one arrangement, the target program may be sent to the associated user account; or, a recommendation message of the target program may be sent to a client corresponding to the associated user account that is not online when the target program is in an on-air state, and/or to a client corresponding to the associated user account whose automatic download function is in an off state when the target program is in the on-air state; and a complete program content or a fragment program content is provided to the associated user account in response to receiving a returned response message. The client corresponding to the user account directly sends the saved target program to the associated user account or is recommended and distributed by the server, so that the associated user account that does not follow the live streaming program during the live streaming program saving process can also obtain the saved target program, which facilitates improving the utilization of saved target programs.

In an arrangement, the program acquisition condition may be sent to a server, such that the server sends a program acquisition instruction of triggering to save the live streaming room data of the user account as the target program to the associated user account of the user account in response to detecting that the live streaming behavior meets the program acquisition condition. By sending the program acquisition condition to the server, the server judges whether the live streaming behavior of the user account in the live streaming program meets the program acquisition condition, which can not only make full use of the computing ability of the server, but also reduce the computing pressure of the client corresponding to the user account, thus improving its response speed during the live streaming and reducing the lag.

According to arrangements of the disclosure, by detecting whether the live streaming behavior of the user account meets the program acquisition condition during the live streaming, it is possible to trigger the user account, the server or the associated user account to save the live streaming data as the target program in response to detecting that the live streaming behavior indeed meets the program acquisition condition. After the saving is completed, the acquired target program is provided to the associated user accounts of various user accounts. In the process of live streaming interaction, wonderful live streaming contents can be automatically identified without manual operation by the user, the corresponding live streaming room data is saved to obtain the target program corresponding to the live streaming room data, so that the user only needs to make a preset live streaming behavior in the live streaming program, and the wonderful live streaming contents in the live streaming program can be automatically saved, which not only improves the interactive experience between the user and its associated users, but also helps the user account to focus more on the live streaming content, thus improving the content quality of the live streaming program.

Figure 3:
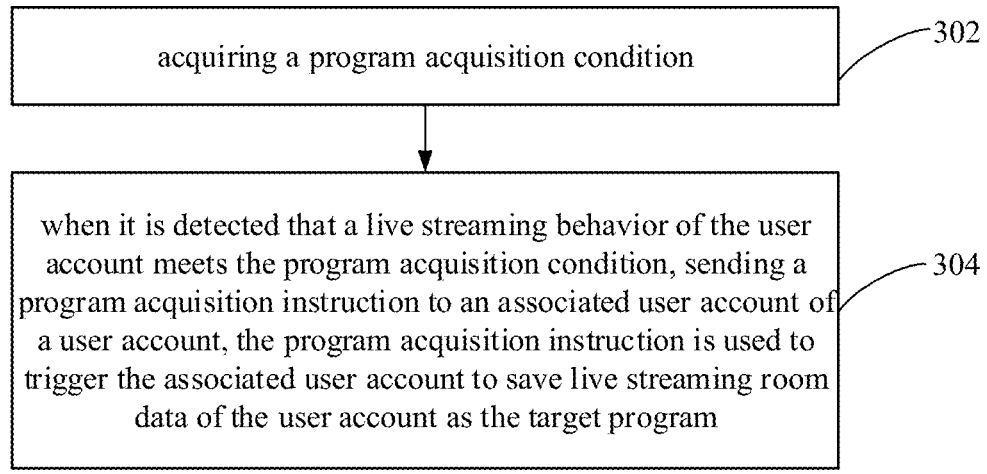
FIG. 3 is a flowchart of a method for acquiring programs in a live streaming room according to some arrangements of the disclosure.

FIG. 3 is a flowchart of a method for acquiring programs in a live streaming room according to one of the example arrangements of the disclosure. The method is applied to a server and includes following steps.

Block 302, a program acquisition condition is acquired.

In an arrangement, a condition setting instruction issued by a user account or an associated user account of the user account may be received, and then the program acquisition condition may be determined according to the condition setting instruction. By receiving condition setting instructions set by different users, it is possible to targetedly determine the highlights of the live streaming program that different users pay attention to, thus generating different target programs for different users, and more humanely meeting different live streaming program acquisition needs of different users.

In one arrangement, according to the source of the above condition setting instruction, the application object of the condition setting instruction may be different: in the case that the condition setting instruction is issued by the user account, the program acquisition condition is applied to the live streaming program currently broadcast in the live streaming room, or all live streaming programs broadcast by the user account. The above-mentioned program acquisition conditions are set by the user account, so that the program acquisition conditions are more in line with the live streaming habits of the user account, and it is convenient to improve the judgment accuracy of the condition matching situation. In the case that the condition setting instruction is issued by the associated user of the user account, the program acquisition condition is applied to the live streaming program currently broadcast in the live streaming room, all the live streaming programs broadcast by the user account, or all the live streaming programs received by the associated account. The above-mentioned program acquisition conditions are set by the associated user account, so that the program acquisition conditions are more in line with the personal habits and preservation wishes of the associated user, which is more humane.

Block 304: a program acquisition instruction is sent to an associated user account of a user account in response to detecting that a live streaming behavior of the user account meets the program acquisition condition. The program acquisition instruction is used to trigger the associated user account to save live streaming room data of the user account as the target program.

In one arrangement, in the case of receiving an automatic acquisition enabling instruction sent by any associated user account of the user account, an automatic acquisition enabling mark may be added to the associated user account. Then, in response to detecting that the live streaming behavior of the user account meets the program acquisition condition, the program acquisition instruction is only sent to the associated user account that the automatic acquisition enabling mark is added to. The associated user accounts are classified according to whether the automatic saving function is enabled, and in response to subsequently detecting that the live streaming behavior of the user account meets the program acquisition condition, the program acquisition instruction is only sent to the associated user account client that the automatic saving function is enabled, which thus makes the transmission of program acquisition instructions more targeted, effectively reduces the transmission of invalid instructions, and improves the control efficiency of the acquisition of live streaming programs.

In an arrangement, the live streaming behavior of the user account may include a live streaming voice, so that in response to detecting that the live streaming voice of the user account meets the program acquisition condition, it can be determined that the detected live streaming behavior of the user account meets the program acquisition condition. By detecting the live streaming voice of the user account to determine whether it meets the program acquisition condition, the user account is allowed to control the start and stop of the data acquisition in the live streaming room through the voice during the live streaming. It frees hands of the user corresponding to the user account during the live streaming, no manual control is required, which is more convenient and efficient.

In an arrangement, the live streaming behavior of the user account may include a live streaming action, so that in response to detecting that the live streaming action of the user account meets the program acquisition condition, it can be determined that the live streaming action of the user account meets the program acquisition condition. By detecting the live streaming action of the user account to determine whether it meets the program acquisition condition, it allows the user account to directly control the start and stop of the data acquisition in the live streaming room through limbs and body movements, gestures, facial expressions and other actions during the live streaming, without manual operations of the user. During the live streaming process, not only hands of the user are freed, but also the user's intention to save the target program can be determined more accurately, thus improving the judgment accuracy of the condition matching.

In one arrangement, the program acquisition condition includes a program acquisition start condition and a program acquisition end condition, and the program acquisition instruction includes a program acquisition start instruction and a program acquisition end instruction. In response to detecting that the live streaming behavior of the user account meets the program acquisition start condition, the program acquisition start instruction may be sent to the associated user account of the user account. In response to detecting that the live streaming behavior of the user account meets the program acquisition end condition, the program acquisition end instruction may be sent to the associated user account of the user account. Detecting that the live streaming behavior of the user account meets the program acquisition start condition corresponds to the start time in response to determining that the live streaming room data is saved as the target program, and detecting that the live streaming behavior of the user account meets the program acquisition end condition corresponds to the end time in response to determining that the live streaming room data is saved as the target program. During the live streaming process, the live streaming start time and live streaming end time are respectively detected in real time, which is convenient for detecting the saving start time and end time of the live streaming room data in time, so as to accurately obtain the live streaming room data.

In one arrangement, a complete program content corresponding to the live streaming room data of the user account may be saved; or, a segment program content corresponding to the target program in the complete program content corresponding to the live streaming room data of the user account may be saved. A start moment of the segment program content is a moment when the live streaming behavior of the user account meets the program acquisition start condition, and an end moment of the segment program content is a moment when the live streaming behavior of the user account meets the program acquisition end condition. The server saves the complete program content or fragment program content corresponding to the target program live streaming program, which helps the server to archive the program content corresponding to the live streaming program, so as to facilitate subsequent analysis or targeted recommendation of the program content.

In an arrangement, a recommendation message of the target program is sent to a client corresponding to the associated user account that is not online when the target program is in an on-air state, and/or to a client corresponding to the associated user account whose automatic download function is in an off state when the target program is in the on-air state; the complete program content or the fragment program content is provided to the associated user account in response to receiving a returned response message. The server recommends the target program to the associated user account, so that the associated user account that does not pay attention to the live streaming program during the live streaming program saving process can also obtain the saved target program, which helps to improve the utilization of the saved target program.

According to arrangements of the disclosure, the server detects whether the live streaming behavior of the user account meets the program acquisition conditions during the live streaming process, and the server can send a program acquisition instruction to the associated user account in response to detecting that the live streaming behavior indeed meets the program acquisition condition, so that the associated user account saves the live streaming room data as the target program. On the one hand, because it detects the live streaming behavior of the user account, no manual operation of the user account is required, and the associated user account does not need to manually operate the interface to obtain the target program corresponding to the live streaming room data, which simplifies the program acquisition operation in the live streaming room. The user only needs to make a preset live streaming behavior in the live streaming program, and the wonderful live streaming contents of the live streaming program may be automatically obtained, which not only improves the interactive experience between the user and its associated users, but also helps the user account to focus more on the live streaming content, thus improving the content quality of the live streaming program.

Figure 4:
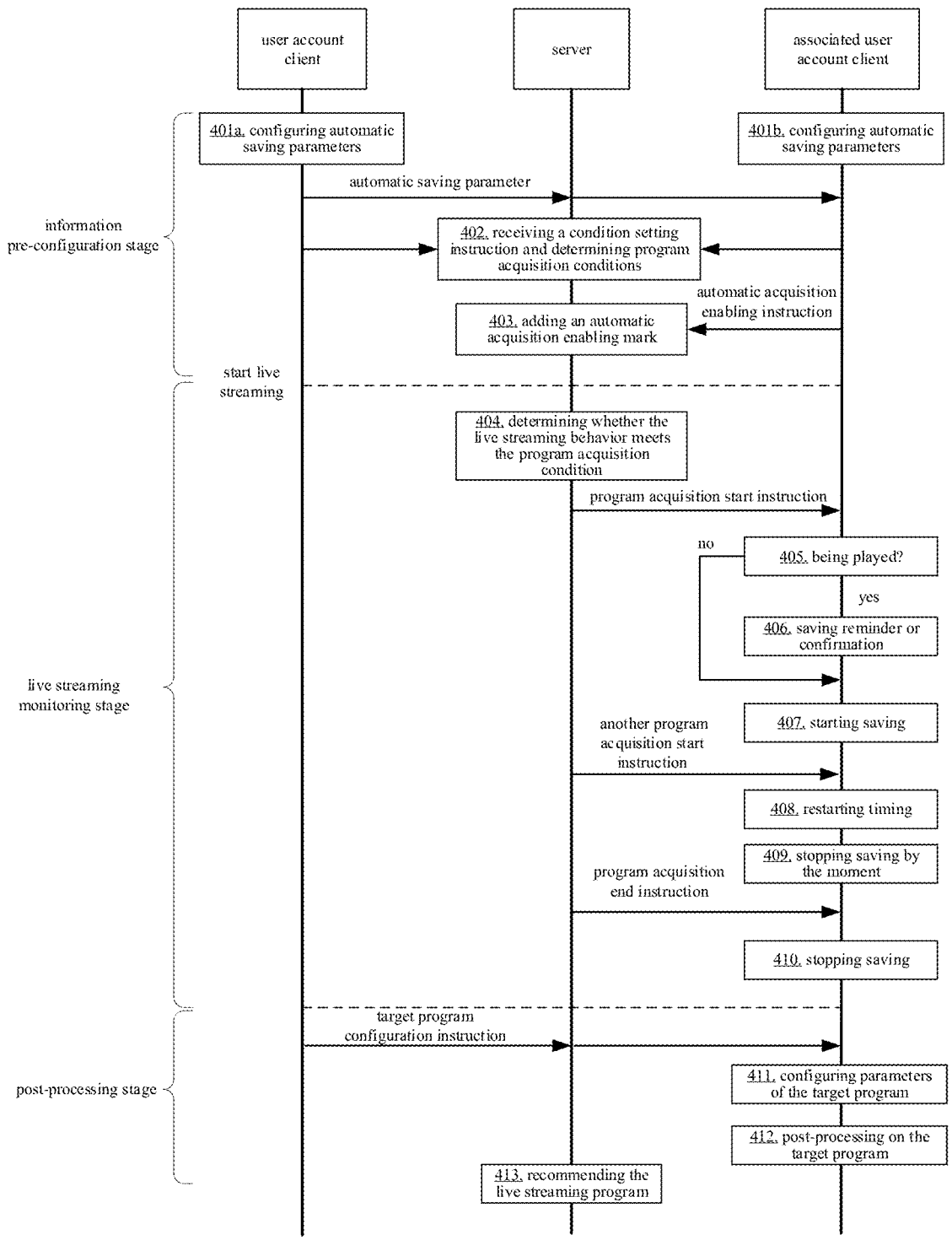
FIG. 4 is an interactive flowchart of a method for acquiring programs in a live streaming room according to some arrangements of the disclosure.

To facilitate understanding, the technical solution of the disclosure will be further described below in conjunction with the arrangement shown in FIG. 4. FIG. 4 is an interactive flowchart of a method for acquiring programs in a live streaming room according to one of the example arrangements of the disclosure, which is applied to a user account client. As shown in FIG. 4, this arrangement logically can be divided into an information pre-configuration stage, a live streaming monitoring stage and a post-processing stage.

In the information pre-configuration stage, users (i.e., user accounts and associated user accounts) set the saving parameters and/or program acquisition conditions for downloading live streaming programs through the client, and send the set program acquisition conditions to the server. In the live streaming monitoring stage, the server can monitor the live streaming behavior of the user account in the live streaming program that is in an on-air state according to the received automatic save control conditions, and then feedback the program acquisition start instruction or the program acquisition end instruction to the associated user account client according to the matching situation between the live streaming behavior of the user account and the program acquisition condition, which enables the associated user account client to automatically start or automatically finish the saving of the live streaming program. In the post-processing stage, relevant processing such as parameter configuration and recommendation is performed on the saved target programs.

It is easy to understand that in actual application processes, the system can concurrently perform the information pre-configuration process of one or more users, the live monitoring process of one or more live streaming rooms, and the process of obtaining and recommending live streaming programs, to satisfy request requirements of multiple users and multiple stages.

The following describes specific arrangements of the disclosure through descriptions of specific implementations.

In block 401*a*, the user account client configures automatic saving parameters.

In an arrangement, the user account client receives the parameter configuration information set by the user account in the saved parameter configuration list, and generates parameter information related to the attributes of the live streaming target program. In some arrangements, the parameter configuration information may involve multiple types, such as saving formats: wmv, avi, mpg, mpeg, 3gp, mov, mp4, fly, etc.; definition: smooth, clear, high-definition, ultra-definition, etc.; video frame rates: 30 fps, 40 fps, 75 fps, etc., this disclosure does not limit this.

In actual applications, the set parameter configuration information can be sent to the associated user account client through the server, to form the default configuration information in the associated user account client. Then, in the case that the associated user account client does not change the corresponding parameter configuration information, the associated user account client can save the live streaming room data according to the default configuration information to obtain the target program.

In order to meet the saving requirements of different associated user accounts for live streaming video based on different parameter configuration information, corresponding parameter conversion functions can be added to the server, such as format conversion functions or definition conversion functions, or the like. Of course, the associated user account client can also receive changes on the default configuration information by the associated user account through saving the parameter configuration list, and then during the process of saving the video file, the associated user account client saves the live streaming room data according to the saving parameter configuration list changed by the associated user account.

In block 401b, the associated user account client configures the automatic saving parameters.

In an arrangement, the associated user account client receives the parameter configuration information set by the associated user account in the saving parameter configuration list, and generates automatic saving parameter information related to the attributes of the live streaming target program.

Associated user accounts can set parameter configuration information through the associated user account client. For the specific setting manner, please refer to the block 401a, which will not be repeated here. In addition, the parameter configuration information may further include the storage location of the target program, the maximum storage duration, the minimum storage duration, timeout deletion, overdeletion, automatic saving under wireless network, and so on.

In practical applications, the associated user account client can monitor the saving time during the process of saving the live streaming room data. In response to detecting the saving time reaches the maximum saving duration included in the parameter configuration information, the associated user account client will be notified to stop saving the live streaming room data. In the case that the saving duration reaches the configured periodical cleaning duration, the live streaming room data whose saving duration has reached the periodical cleaning duration in the client can be saved.

The associated user account can make the above settings uniformly for all the live streaming programs acquired by the account, or the configured parameter configuration information can only be applied to some live streaming programs, such as the live streaming program that the associated user account is following or some live streaming programs specified by the associated user account in the configuration page.

It can be understood that in practical applications, only the above block 401a may be performed, or only the block 401b may be performed, or both the above block 401a and the block 401b may be performed. In the case of performing both blocks 401a and 401b, if a certain automatic saving parameter set by the user account and a certain automatic saving parameter set by the associated user account are of the same type but of different specific values, the automatic saving parameter value set by the associated user account will be considered preferentially to save the live streaming room data. For example, the video frame rate set by the user account is 40 fps, and the video frame rate set by the associated user account is 75 fps, then the live streaming room data will be saved at 75 fps.

In block 402, the server receives a condition setting instruction and determines program acquisition conditions.

The server determines the program acquisition condition according to the received condition setting instruction issued by the user account client or the associated user account client.

The user corresponding to the user account can issue the condition setting instructions in a variety of ways. In one arrangement, the user account client may display a recording interface for saving text wake-up words. The user reads the preset text wake-up words displayed by the user account client, such as "start saving", "finish saving", etc., and the user account client records the corresponding preset start wake-up voice and preset end wake-up voice; or, the user speaks a voice clip by himself, such as "I will start saving", "I will finish saving", etc., and the user account client records the corresponding customized start wake-up voice and customized end wake-up voice. At this time, the program acquisition start condition may be that: the live streaming voice in the live streaming program matches the above preset start wake-up voice or customized start wake-up voice; the saving end condition can be that: the live streaming voice in the live streaming program matches the above preset end wake-up voice or customized end wake-up voice.

In another arrangement, the user account client can show the user a selection or input interface for saving text wake-up words. The user selects preset text wake-up words in the user account client, such as "start saving", "finish saving", etc., and the user account client records the selected preset start wake-up words and preset end wake-up words; or, the user enters the text wake-up words by himself, such as "start", "finish", etc., and the user account client records customized start and end wake-up words entered by the user. At this time, the program acquisition start condition may be that: the live streaming text obtained by converting the live streaming voice in the live streaming program matches the above-mentioned preset start wake-up word or customized start wake-up word; the program acquisition end condition may be that: the live streaming text obtained by converting the live streaming voice in the live streaming program matches the above-mentioned preset end wake-up word or customized end wake-up word.

The preset start wake-up words and the customized start wake-up words in the above two arrangements, and the text wake-up words corresponding to the preset start wake-up voice and the customized start wake-up voice are collectively called start keywords; and the preset end wake-up words and customized end wake-up words in the above two arrangements and the text wake-up words corresponding to the preset end wake-up voice and customized end wake-up voice are collectively called end keywords. The specific process of performing wake-up word matching through the voice or extracting the text according to the voice and performing wake-up word matching on the text can be found in the content disclosed in the related art, which is not limited in the disclosure.

In another arrangement, the user account client can display the live streaming action selection or entry interface for the user. In some arrangements, the candidate live streaming action can be in the form of pictures, and the live streaming action entry can capture actions made by the user or record user-defined actions in a matchstick form, or the like. Then, the user selects preset wake-up actions (such as limbs and body movements, gestures, facial expressions, etc.) in the user account client, for example, "scissors hands", "thumbs up", etc., and the user account client records the selected preset start wake-up action and preset end wake-up action; or the user enters the wake-up action by himself, such as "raise right hand", "stretch arms", etc., and the user account client records the customized start wake-up action and customized end wake-up action input by the user. At this time, the program acquisition start condition may be that: the live streaming action extracted from the live streaming screen of the live streaming program matches the above preset start wake-up action or customized start wake-up action; the program acquisition end condition may be that: the live streaming action extracted from the live streaming screen of the live streaming program matches the above preset end wake-up action or customized end wake-up action. The preset start wake-up action and the customized start wake-up action in this arrangement are collectively called the start action; and the preset end wake-up action and the customized end wake-up action are collectively called the end action.

Similarly, if the condition setting instruction is issued by the associated user account client, the associated user account client can record the saving wake-up features in the form of such as voice, text, or action of the user corresponding to the associated user account. In some arrangements, the associated user can select the corresponding preset options, the associated user account client can also enter the customized features input by the associated user. The specific process is similar to that the user account client records the customized features input by the user, and will not be repeated here.

If the user account client records the program acquisition start conditions and program acquisition end conditions set by the user, the user account client can send the recording results to the server in the form of condition setting instructions after recording. Accordingly, the above program acquisition start conditions and the program acquisition end conditions can be applied to the current live streaming program or all live streaming programs broadcast by the aforementioned user account. If the associated user account client records the program acquisition start conditions and program acquisition end conditions set by the associated user, the associated user account client can send the recording results to the server in the form of condition setting instructions after recording. Accordingly, the above program acquisition start condition and the program acquisition end condition may be applied to the current live streaming program, all live streaming programs broadcast by the user account, or all live streaming programs played by the above associated user account client.

In block 403, the server receives the program acquisition start instruction sent by the associated user account client and adds an automatic acquisition enabling mark to the associated user account client.

In fact, the technical solutions of saving the video interface in the associated user account client involved in the disclosure all require the associated user account client to enable the aforementioned automatic saving function. The user corresponding to the associated user account can choose to enable or disable the automatic saving function of the associated user account client.

In one arrangement, any associated user account client whose automatic saving function is in an enabling state sends an automatic saving enabling instruction to the server, and the server adds an automatic acquisition enabling mark to the associated user account client after receiving the instruction. Correspondingly, in response to determining in the subsequent block 404 that the live streaming behavior meets the program acquisition start condition or the program acquisition end condition, the program acquisition start instruction or the program acquisition end instruction may only be sent to the associated user account client to which the automatic acquisition enabling mark is added. Thus, the effective sending range of related instructions is ensured, and the waste of network resources caused by sending the above instructions to all associated user account clients and invalid responses from associated user account clients are avoided.

To facilitate the description of the solution of the disclosure, "start live streaming" is marked in FIG. 4, but it is understandable that, in fact, blocks 401*a* to 403 can also be performed after the live streaming program is broadcast.

In block 404, the server determines whether the live streaming behavior meets the saving condition.

During the live streaming process, the server determines whether the live streaming behavior of the user account in the live streaming program meets the program acquisition start condition and the program acquisition end condition. In an arrangement, the server analyzes the live streaming behavior of the user account in the live streaming program, to determine whether the live streaming behavior meets the program acquisition start condition or the program acquisition end condition. The above analysis process is the process of determining whether the live streaming behavior meets the preset program acquisition start condition or program acquisition end condition. It should be noted that the above live streaming behavior is the behavior performed by the "user account" in the live streaming program. In some arrangements, the "user account" here can be the user account that performs the program content, or can also be staff next to the user account, and this disclosure does not limit this.

According to different live streaming behaviors, the above determination process is also different. In one arrangement, the live streaming behavior includes the live streaming voice. At this time, if the live streaming voice in the live streaming program matches the start keyword defined by the program acquisition start condition, then it is determined that the live streaming behavior meets the preset program acquisition start condition; if the live streaming voice in the above live streaming program matches the end keyword defined by the program acquisition end condition, it is determined that the live streaming behavior meets the preset program acquisition end condition.

In some arrangements, as an example arrangement, the start keyword and the end keyword are the start wake-up voice (preset start wake-up voice or customized start wake-up voice) and end wake-up voice (preset end wake-up voice or customized end wake-up voice) in the voice form respectively. The server may respectively extract the voice features of the start keyword and the voice features of the end keyword corresponding to the start keyword and the end keyword in advance, such as acoustic parameters such as sound frequency, sound loudness, and/or sound phase. During the live streaming process, the server obtains the live streaming voice from the live streaming program, and then extracts the corresponding acoustic parameters of the live streaming voice and compares it with the above-mentioned start keyword voice feature and end keyword voice feature. In the case that the corresponding acoustic parameters of the live streaming voice match the voice features of the start keyword, it is determined that the live streaming behavior meets the preset program acquisition start conditions; in the case that the corresponding acoustic parameters of the live streaming voice match the voice features of the end keyword, it is determined that the live streaming behavior meets the preset program acquisition end conditions.

As another example arrangement, the start keyword and the end keyword are the start wake-up word (preset start wake-up word or customized start wake-up word) and end wake-up word (preset end wake-up word or customized end wake-up word) in the text form, respectively. During the live streaming process, the server may obtain the live streaming voice from the live streaming program, then convert the live streaming voice to the live streaming text, and compare the converted live streaming text with the above start and end wake-up words. In the case where the converted live streaming text matches the start keyword, it is determined that the live streaming behavior meets the preset program acquisition start conditions; in the case where the converted live streaming text matches the end keyword, it is determined that the live streaming behavior meets the preset program acquisition end conditions.

As another example arrangement, the live streaming behavior includes a live streaming action. At this time, if the live streaming action in the live streaming program matches the start action defined by the program acquisition start condition, it is determined that the live streaming behavior meets the preset program acquisition start condition; if the live streaming action in the live streaming program matches the end action defined by the program acquisition end condition, it is determined that the live streaming action meets the preset program acquisition end condition.

In some arrangements, if the live streaming action includes the start wake-up action (preset start wake-up action or customized start wake-up action) and end wake-up action (preset end wake-up action or customized end wake-up action) in the action form, the server can respectively extract the start wake-up action feature and the end wake-up action feature corresponding to the start wake-up action and end wake-up action in advance. During the live streaming, the server can extract the real-time action features of the live streaming action from the live screen of the live streaming program, such as limbs and body movement contours, a contour of the gesture, the angle of the fingers, the facial expressions and/or the open degree of the mouth and the like, of the user corresponding to the user account, then the extracted real-time action feature is compared with the start and end wake-up action features respectively. In response to determining that the extracted real-time action feature matches the start wake-up action feature, it is determined that the live streaming behavior meets the preset program acquisition start conditions. In response to determining that the extracted real-time action feature matches the end wake-up action feature, it is determined that the live streaming behavior meets the preset program acquisition end condition.

In another arrangement, the server directly receives the conformity situation between the live streaming behavior sent by the user account client and the program acquisition start condition or the program acquisition end condition. In fact, the conformity situation between the live streaming behavior sent by the user account client and the program acquisition start condition or the program acquisition end condition is also determined through the above analysis process, and the specific process will not be repeated.

Corresponding to the above analysis result, in response to determining that that the live streaming behavior meets the preset program acquisition start condition, a program acquisition start instruction is sent to the associated user account client. In response to determining that that the live streaming behavior meets the preset program acquisition end condition, a program acquisition end instruction is sent to the associated user account client.

In block 405, the associated user account client determines whether a live streaming program is currently being played.

After the associated user account client receives the program acquisition start instruction sent by the server, it is determined whether it is currently playing a live streaming program. If the above live streaming program is being played, go to block 406; otherwise, if the above live streaming program is not played, then go to block 407.

In block 406, the associated user account client displays saving reminder information or a saving start confirmation option.

At this time, the associated user account client that has received the program acquisition start instruction is playing the live streaming program. In one arrangement, the saving start reminder information is displayed to remind the associated user account user to start saving the live streaming program that he is watching, so that the user can know that the live streaming room data has been started to be saved at this time.

In another arrangement, the saving start confirmation option is displayed for the user to confirm to save the live streaming program being played, and the live streaming room data is started to be saved after the user's confirmation instruction for the saving start confirmation option is received. Otherwise, if a cancellation instruction of the associated user account user is received, the saving at this time will be abandoned. If the confirmation instruction or cancellation instruction issued by the user of the associated user account is not received after waiting for a preset duration, the above live streaming room data will be started to be saved. Through the above manner, when the user is watching a live streaming program, it is preferably to save the live streaming room data or give up saving the live streaming room data according to the user's wishes.

In block 407, the associated user account client starts to save the live streaming room data.

In the case that the automatic saving parameters have been set by the user account client in block 401*a*, or the automatic saving parameters have been set by the associated user account client in block 401*b*, the associated user account client starts to save the above live streaming room data according to the above automatic saving parameters. It is understandable that in block 401*a*, in the case that the user account client has set the automatic saving parameters, the automatic saving parameters set by the user account client can be sent to the associated user account client in advance, or can be sent to the associated user account client associated with the program acquisition start instruction.

In addition, in response to determining that both the user account client and the associated user account client are set with automatic saving parameters, and the parameters set by them two have the same parameter, the live streaming room data will be saved according to the automatic saving parameters set by the associated user account client preferably. If the user account client sets the default resolution for saving the target program as "smooth", and the associated user account client sets the default resolution for saving the target program as "high definition", then the live streaming room data will be saved according to the high definition resolution, so as to give priority to the user of the associated user account, and meet the needs of the user of the associated user account as much as possible. In the case that the above blocks 401a and 401b are not executed, the default saving parameters preset by the system in the associated user account client can also be used for the above saving. For example, the live streaming room data is saved in the preset save location "C:\Users\Default\Videos"; after the saving is completed, the saved target program is named as "small white 202101011200" according to the default manner "user account ID+date+time", or the like.

In block 408, if another program acquisition start instruction is received before the saving is finished, the associated user account client restarts timing.

In one arrangement, if the saving of the live streaming room data has been started and the saving of the live streaming room data has not been stopped, if the second program acquisition start instruction sent by the server is received, the saving of the live streaming room data restarts according to the second program acquisition start instruction. It can be understood that the "second program acquisition start instruction" here is "another program acquisition start instruction" different from the program acquisition start instruction received before block 405. The above-mentioned restarting to save the live streaming room data is to update the saving start time of currently saving the live streaming room data, and continue to save on the basis that the target program is generated currently (the saving has not been completed).

It can be seen that in the case that the user account has performed multiple consecutive behaviors that meet the start saving conditions, the start time is determined according to the latest start saving instruction. In response to determining that the maximum saving duration is set, the saving interruption can be reduced, and a relatively complete target program can be obtained finally, which avoids the cumbersome operation caused by a large number of short-time target programs.

In block 409, if the maximum saving duration is preset, the associated user account client terminal stops the saving after the saved duration reaches the maximum saving duration.

In one arrangement, the automatic saving parameters set by the user account client in the above block 401a or the automatic saving parameters set by the associated user account user in block 401b include the maximum saving duration, and the associated user account client does not receive the program acquisition end instruction from the time when the saving starts to the time when the maximum saving duration expires, the associated user account client will stop the current saving of the live streaming room data after the maximum saving duration expires.

For example, in the case of preset maximum saving duration Tmax=30 min, in response to determining that the live streaming program saved from 12:00 at noon proceeds to 12:30, the user account does not make a saving stop trigger action, then it will stop saving the live streaming room data at 12:30, and the final saved target program corresponds to live streaming contents of 30 minutes from 12:00-12:30 in the live streaming program.

It is understandable that in response to determining that the maximum saving duration is reached and the saving ends, saving of the next cycle can be automatically started, until the program acquisition end instruction sent by the server is received, and of course, saving of the live streaming room data can also be exited.

In block 410, after receiving the program acquisition end instruction, the associated user account client stops saving the live streaming room data.

In one arrangement, the automatic saving parameters set by the user account client in the above block 401a or the automatic saving parameters set by the associated user account user in block 401b include the minimum saving duration. The associated user account client checks whether the current saved duration is not less than the minimum saving duration after receiving the program acquisition end instruction. If the current saved duration is less than the minimum saving duration, it continues to save until the minimum saving duration reaches; if the current saved duration is not less than the minimum saving duration, it stops saving immediately.

In another arrangement, if the live streaming room data continues to be saved because the current saved duration is less than the minimum saving duration, and a certain moment of the minimum saving duration has not yet reached, another program acquisition start instruction as described in block 408 above is received, then the live streaming room data is started to be saved again according to another program acquisition start instruction, and the saving is continued after the minimum saving duration is reached.

In the process of saving the live streaming room data, if the associated user account client receives the program acquisition end instruction sent by the server, the current saving of the live streaming room data is stopped. After the saving is stopped, the corresponding target program will be generated at the preset saving location of the associated user account client. The start moment of the target program is the moment in response to determining that the user account's live streaming behavior of the live streaming program meets the preset program acquisition start condition, and the end moment of the target program is the moment in response to determining that the user account's live streaming behavior of the live streaming program meets the preset saving stop condition.

It is understandable that during the live streaming of any live streaming program, the associated user account client may perform the above-mentioned process of saving the live streaming room data at different durations, and finally obtain multiple different target programs. Moreover, since the live streaming system has the feature of one (user account client) to many (associated user account client), when different associated user account clients set the saving conditions respectively, the target programs saved by each associated user account client are not exactly the same.

In block 411, the associated user account client configures the parameters of the target program according to the received target program configuration instruction.

In one arrangement, after the saving is completed, the user account client forwards the target program configuration instruction to the associated user account client through the server, and the associated user account client configures the parameters of the saved target program according to the received instructions. In another arrangement, after the saving is completed, the associated user account user may issue a target program configuration instruction to the associated user account client, so that the associated user account client can configure the parameters of the saved target program according to the above instructions.

In block 412, the associated user account client performs post-processing on the saved target program.

As for the target program saved by the associated user account client, post-processing such as playback, editing, secondary creation and/or sharing can be performed. In some arrangements, the above-mentioned post-processing can be performed by the self-contained tool of the aforementioned associated user account client, or by other functional software.

In block 413, the server recommends the above-mentioned live streaming program to other associated user account clients that have not saved the live streaming room data.

In an arrangement, the server may store and back up the complete program of each live streaming program from the beginning of the broadcast to the end of the broadcast, or in the process of the associated user account client saving a part of the complete program, the server synchronously saves the part of the complete program; or the associated user account client uploads the target program saved by itself to the server, thus realizing the backup of the live streaming program. Backing up the live streaming program by the server can facilitate the server to archive, classify or recommend the live streaming room data in the live streaming room.

Of course, the server may also save the identification information of the live streaming program corresponding to the live streaming room data saved by the associated user account client of the preset number, the start position and the end position of the saved live streaming room data, and then in response to determining that a request for extracting a part of the complete program is received, the part of the complete program corresponding to the identification information of the live streaming program will be extracted according to the start position and end position of the saved live streaming program, so that the extracted part program responds to the received request.

Further, the server may send recommendation information for the live streaming program to the associated user account client that has not saved the live streaming room data, and then, in the case of receiving the returned response information, based on the complete target program or the segment of the target program, provide download or on-demand services for the associated user account client that returns the response message. In this arrangement, for users who need to save the live streaming program but cannot save the live streaming room data in real time, they can order or download the complete content of the unsaved live streaming room data online or the content in which the attribute information of the live streaming room meets preset conditions, by responding to the recommendation information of the live streaming program.

Figure 5:
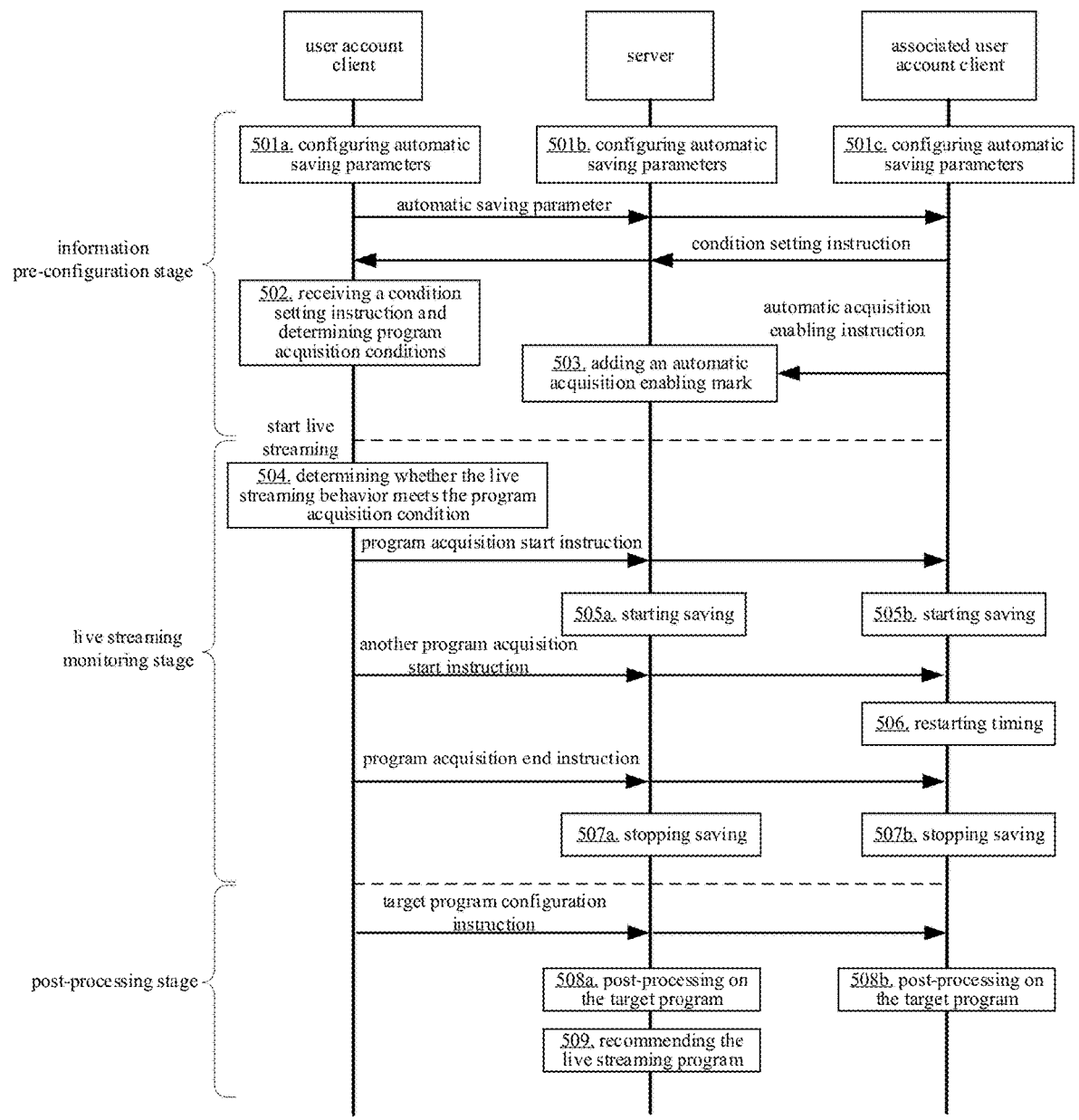
FIG. 5 is an interactive flowchart of a method for acquiring programs in a live streaming room according to some arrangements of the disclosure.

FIG. 5 is an interactive flowchart of a method for acquiring programs in a live streaming room according to another arrangement of the disclosure. As shown in FIG. 5, the following blocks may be included.

In block 501*a*, the user account client configures automatic saving parameters.

In one arrangement, the user account client displays the default saving parameter configuration list to the user account, so that the user account issues a default saving parameter configuration instruction based on the list; then the user account client configures the default saving parameters of the live streaming program according to the received default saving parameter configuration instruction; after the configuration is completed, the above will be forwarded to the associated user account client through the server. For the specific configuration process, please refer to block 401*a*, which will not be repeated here.

In block 501*b*, the server configures automatic saving parameters.

The background management personnel or operation and maintenance personnel of the live streaming system can configure the automatic saving parameters through the server, and the disclosure does not limit the specific content of the automatic saving parameters. After the configuration is completed, the server sends the configured automatic saving parameters to the corresponding associated user account client.

In block 501*c*, the associated user account client configures automatic saving parameters.

In another arrangement, the associated user account client displays the default saving parameter configuration list to the user corresponding to the associated user account, so that the user corresponding to the associated user account issues a default saving parameter configuration instruction based on the list; then the associated user account client configures the default saving parameters of the live streaming program according to the received default saving parameter configuration instruction. For the specific configuration process, please refer to block 401*b*, which will not be repeated here.

In block 502, the user account client determines the program acquisition start condition and the program acquisition end condition.

In one arrangement, the program acquisition start condition and program acquisition end condition can be set by the user corresponding to the user account at the user account client, or can be forwarded by the server to the user account client after set by the user corresponding to the associated user account at the associated user account client. In another arrangement, the program acquisition start condition and the program acquisition end condition are set by the background management personnel or operation and maintenance personnel of the live streaming system through the server. For the specific process, please refer to block 402, which will not be repeated here.

In block 503, the server receives the automatic saving enabling instruction sent by the associated user account client and adds an automatic acquisition enabling mark to the associated user account client.

In response to determining that the automatic saving function for the video program is enabled, the associated user account client sends an automatic saving enabling instruction to the server, and the server adds an automatic acquisition enabling mark to the associated user account client after receiving the instruction. For the specific marking process, please refer to block 403, which will not be repeated here.

In block 504, the user account client determines whether the live streaming behavior matches the program acquisition conditions.

During the live streaming process, the user account client analyzes the live streaming behavior of the user account in the live streaming program, to determine whether the live streaming behavior meets the program acquisition start condition or the program acquisition end condition. In response to determining that the live streaming behavior matches the program acquisition start condition, the server forwards the program acquisition start instruction to the associated user account client. In response to determining that the live streaming behavior matches the program acquisition end conditions, the server forwards the program acquisition end instruction to the associated user account client. Please refer to block 404 for the specific process of analyzing and determining the above-mentioned compliance situation, which will not be repeated here.

In block 504a, the server starts to save the live streaming room data.

In one arrangement, after the server receives the live streaming start instruction sent by the user account client, it saves the live streaming room data locally according to the live streaming start instruction. Of course, the above-mentioned "local" can be the storage space of the server itself, or other storage space connected to the server by a network. This disclosure does not limit this, but the location of the program acquisition in the live streaming room of the server should be different from the saving location of the live streaming room data in associated user account client.

In block 504b, the associated user account client starts to save the live streaming room data.

After receiving the program acquisition start instruction forwarded by the server, the associated user account client starts to save the live streaming room data. For the specific saving process, please refer to block 407, which will not be repeated here.

In block 506, if another program acquisition start instruction is received before the saving is completed, the associated user account client restarts timing.

In response to determining that saving of the live streaming room data has been started and saving of the live streaming room data has not been stopped, if the second program acquisition start instruction sent by the server is received, the associated user account client restarts saving the live streaming room data according to the second program acquisition start instruction. In fact, in response to determining that the server has started to save the live streaming room data and has not stopped saving the live streaming room data, if it receives the second program acquisition start instruction sent by the server, it can also restart saving the live streaming room data according to the second program acquisition start instruction (not shown in FIG. 5).

In block 507a, if the program acquisition end instruction is received, the server stops saving the live streaming room data.

After receiving the program acquisition end instruction sent by the live streaming client, the server stops saving the live streaming room data locally.

In block 507b, after receiving the program acquisition end instruction, the associated user account client stops saving the live streaming room data.

In one arrangement, the automatic saving parameters set by the user account client in block 501a, the automatic saving parameters set by the server in block 501b, or the automatic saving parameters set by the associated user account user in block 501c include the minimum saving duration. After receiving the program acquisition end instruction, the associated user account client checks whether the current saved duration is not less than the minimum saving duration. If the current saved duration is less than the minimum saving duration, it will continue to save until the minimum saving duration expires; if the current saved time is not less than the minimum saving duration, then it stops saving.

In another arrangement, if the live streaming room data continues to be saved because the current saved duration is less than the minimum saving duration, and a certain moment of the minimum saving duration has not yet reached, another program acquisition start instruction as described in above block 506 is received. The live streaming room data is started to be saved again according to another program acquisition start instruction, and the saving is continued after the minimum saving duration is reached.

In the process of saving the live streaming room data, if the associated user account client receives the program acquisition end instruction sent by the server, the current saving of the live streaming room data is stopped. After the saving is stopped, the corresponding target program will be generated at the preset saving location of the associated user account client. The start moment of the target program is the moment when the user account's live streaming behavior of the live streaming program meets the preset program acquisition start condition, and the end moment of the target program is the moment when the user account's live streaming behavior of the live streaming program meets the preset saving stop condition.

In block 508a, the server performs post-processing on the saved target program.

For the target program stored by the server, post-processing such as format conversion, compression, backup, extraction of user account information and/or analysis of associated user account user information is performed, to produce user portraits, provide download or on-demand services.

In block 508b, the associated user account client performs post-processing on the saved target program.

As for the target program saved by the associated user account client, post-processing such as playback, editing, secondary creation and/or sharing can be performed. In some arrangements, the above-mentioned post-processing can be performed by the self-contained tool of the aforementioned associated user account client, or by other functional software. In fact, there is no essential difference between the target program saved by the solution described in the disclosure and other files saved in the terminal, so the specific manner of post-processing is not limited by the disclosure.

In block 509, the server recommends the above-mentioned live streaming program to other associated user account clients that have not saved the live streaming room data.

After the server obtains the target program corresponding to the live streaming program through the above blocks 504a-507a, it can recommend the above live streaming program to the associated user account client that has not saved the live streaming room data. In the case where the server does not perform the above blocks 504a-507a, that is, the server does not save the live streaming room data locally, the associated user account client can upload the target program corresponding to the saved live streaming room data to the server, such that the server recommends the above live streaming program to the associated user account client that does not save the above live streaming room data.

In some arrangements, a recommendation message for the above-mentioned live streaming program is sent to the associated user account client that does not save the above-mentioned live streaming room data, for the associated user account user to select; and then in the case of receiving the response message returned by the above-mentioned associated user account client, downloading or on-demand services are provided to the associated user account client that returns a response message based on the above-mentioned complete target program or fragment target program.

Figure 6:
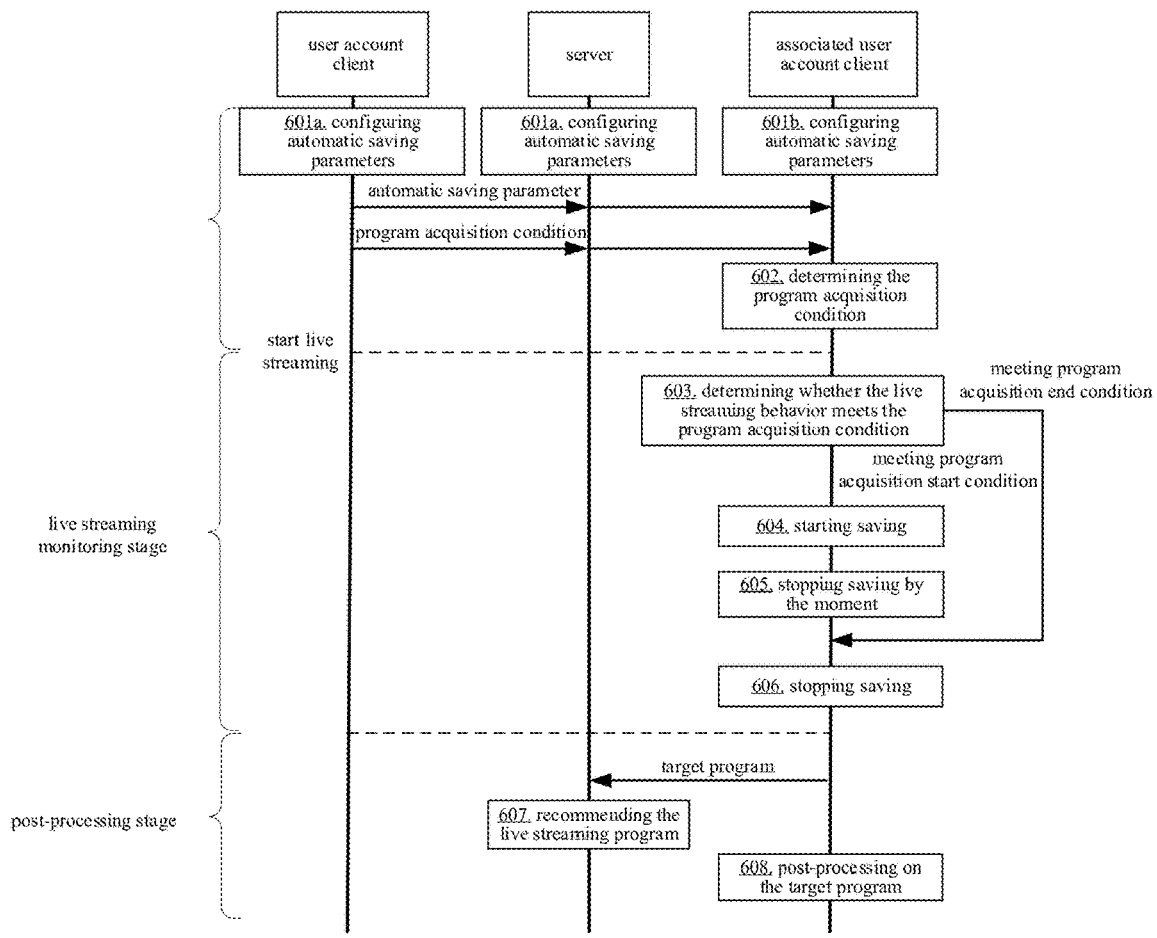
FIG. 6 is an interactive flowchart of a method for acquiring programs in a live streaming room according to some arrangements of the disclosure.

FIG. 6 is an interactive flowchart of a method for acquiring programs in a live streaming room according to still another arrangement of the disclosure. As shown in FIG. 6, the following blocks may be included.

In block 601*a*, the user account client configures automatic saving parameters.

In block 601*b*, the server configures automatic saving parameters.

In block 601*c*, the associated user account client configures automatic saving parameters.

For the specific process of the foregoing block 601*a*-block 601*c*, please refer to the foregoing block 501*a*-block 501*c*, which will not be repeated here.

In block 602, the associated user account client determines the program acquisition start condition and the saving end condition.

In an arrangement, the program acquisition start condition and saving end condition can be set by the associated user account user at the associated user account client, or can be forwarded to the associated user account client by the user account through the server after set by the user account client; or can also be set by the background management staff or operation and maintenance staff of the live streaming system through the server, and sent to the associated user account client after the setting is completed.

In block 603, the associated user account client determines whether the live streaming behavior meets the saving condition.

During the live streaming process, the associated user account client analyzes the live streaming behavior of the user account in the live streaming program, to determine whether the live streaming behavior meets the program acquisition start condition or the saving end condition. In response to determining that the live streaming behavior matches the program acquisition start condition, go to block 604; in the case that the live streaming behavior matches the saving end condition, go to block 606; in the case that the previous neighboring situation is that the live streaming behavior matches the program acquisition start condition, go to block 607. For the specific process of the above analysis and determination, please refer to block 404, which will not be repeated here.

In block 604, the associated user account client starts to save the live streaming room data.

For the specific saving process, please refer to block 407, which will not be repeated here.

In block 605, if the longest and maximum saving duration is preset, the associated user account client will stop saving in response to determining that the time expires.

The automatic saving parameters set by the user account client in block 601*a*, the automatic saving parameters set by the server in block 601*b*, or the automatic saving parameters set by the associated user account user in block 601*c* include the maximum saving duration, and the associated user account client does not determine that the live streaming behavior meets the saving end condition from the time when the saving is started to the time when the maximum saving duration expires, then the associated user account client stops the current saving of the live streaming room data after the maximum saving duration expires. For the specific stopping process, please refer to block 409, which will not be repeated here.

In block 606, if it is determined that the live streaming behavior meets the saving end condition, the associated user account client stops saving the live streaming room data.

In the case where it is determined that the live streaming behavior meets the saving end condition, the associated user account client stops saving the live streaming room data.

In block 607, the server recommends the above-mentioned live streaming program to other associated user account clients that have not saved the live streaming room data.

In one arrangement, the associated user account client uploads the target program corresponding to the saved live streaming room data to the server, so that the server recommends the above-mentioned live streaming program to the associated user account client that does not save the above-mentioned live streaming room data. In some arrangements, a recommendation message for the above-mentioned live streaming program is sent to the associated user account client that does not save the above-mentioned live streaming room data, for the associated user account user to select; and then in the case of receiving the response message returned by the above-mentioned associated user account client, downloading or on-demand services are provided to the associated user account client that returns a response message based on the above-mentioned complete target program or fragment target program.

In block 608, the associated user account client performs post-processing on the saved target program.

As for the target program saved by the associated user account client, post-processing such as playback, editing, secondary creation and/or sharing can be performed. In some arrangements, the above-mentioned post-processing can be performed by the self-contained tool of the aforementioned associated user account client, or by other functional software. In fact, there is no essential difference between the target program saved by the solution described in the disclosure and other files saved in the terminal, so the specific manner of post-processing is not limited by the disclosure.

The technical solutions provided by arrangements of the disclosure at least bring the following beneficial effects.

According to arrangements of the disclosure, in response to detecting that that a live streaming behavior of the user account meets the program acquisition condition, it is triggered to save live streaming room data of current interaction of a user account as a target program, and the target program is provided to an associated user account of the user account. In this way, during the live streaming interaction process, wonderful live streaming contents can be automatically identified without manual operation by the user, the corresponding live streaming room data is saved, and the saved target program is provided to users interacting with the user or other users who follow the user, thus improving the interactive experience between the user and his associated users.

Figure 7:
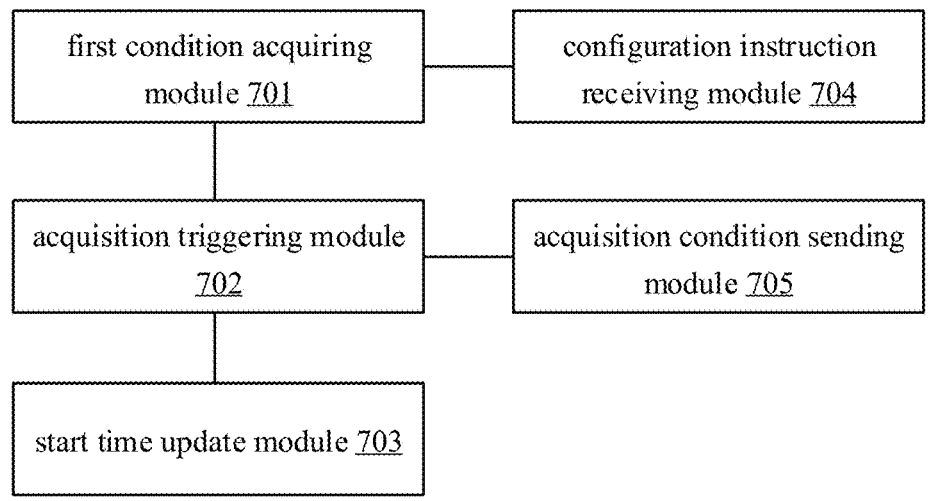
FIG. 7 is a schematic block diagram of an apparatus for acquiring programs in a live streaming room according to some arrangements of the disclosure.

FIG. 7 is a schematic block diagram of an apparatus for acquiring programs in a live streaming room according to one of the arrangements of the disclosure. The apparatus for acquiring programs in a live streaming room shown in this arrangement may be suitable for webcast applications. The application is suitable for a server. The server may be a personal computer, an industrial computer, an industrial personal computer or other network devices which can provide video services to clients. The webcast client corresponding to the server is installed on a terminal, which includes but is not limited to electronic devices such as mobile phones, tablet computers, wearable devices, and personal computers. The webcast client can be an application installed in the terminal or a web version application integrated in the browser. The user can connect to the server through the webcast client and enter the live streaming room to watch the live streaming program. The live streaming program can be a pure audio program, a pure video program, a video program containing audio signals, or an immersive program containing gravity, light, heat and other recognizable signals.

As shown in FIG. 7, the apparatus for acquiring programs in a live streaming room is applied to the user account client and may include:

a first condition acquiring module 701, configured to acquire a program acquisition condition; and an acquisition triggering module 702, configured to trigger to save live streaming room data of a user account as a target program in response to detecting that a live streaming behavior of the user account meets the program acquisition condition, to provide the target program to an associated user account of the user account.

In some arrangements, the first condition acquiring module is further configured to:

receive a condition setting instruction issued by the user account or the associated user account of the user account;

determine the program acquisition condition based on the condition setting instruction.

In some arrangements, the live streaming behavior includes a live streaming voice, the acquisition triggering module is further configured to detect that the live streaming voice of the user account meets the program acquisition condition.

In some arrangements, the live streaming behavior includes a live streaming action, the acquisition triggering module is further configured to detect that the live streaming action of the user account meets the program acquisition condition.

In some arrangements, the program acquisition condition includes a program acquisition start condition and a program acquisition end condition, and the acquisition triggering module is further configured to:

trigger to start saving the live streaming room data of the user account as the target program in response to detecting that the live streaming behavior of the user account meets the program acquisition start condition, trigger to stop saving the live streaming room data of the user account as the target program in response to detecting that the live streaming behavior of the user account meets the program acquisition end condition.

In some arrangements, the apparatus further includes:

a start time update module 703, configured to, trigger to serve an any moment as a saving start moment to recalculate a storage duration of the live streaming room data, in response to detecting that the live streaming behavior meets the program acquisition start condition again at the any moment, after start of saving the live streaming room data is triggered.

In some arrangements, the acquisition triggering module is further configured to:

trigger a client corresponding to the user account to save the live streaming room data of the user account as the target program; or, send the program acquisition instruction to a server, to trigger the server to save the live streaming room data of the user account as the target program; or, send a program acquisition instruction to the server, such that the server forwards the program acquisition instruction to the associated user account. The program acquisition instruction is used to trigger a client corresponding to the associated user account to save the live streaming room data of the user account as the target program.

In some arrangements, the apparatus further includes:

a configuration instruction receiving module 704, configured to receive a target program configuration instruction issued by the user account. The target program configuration instruction is used to instruct a client corresponding to the user account, a server, and/or a client corresponding to the associated user account to perform parameter configuration on the saved target program.

In some arrangements, the acquisition triggering module is further configured to:

send the target program to the associated user account; or, send a recommendation message of the target program to a client corresponding to the associated user account that is not online when the target program is in an on-air state, and/or to a client corresponding to the associated user account whose automatic download function is in an off state when the target program is in the on-air state; and provide a complete program content or a fragment program content to the associated user account in response to receiving a returned response message.

In some arrangements, the apparatus further includes:

an acquisition condition sending module 705, configured to send the program acquisition condition to a server, such that the server sends a program acquisition instruction of triggering to save the live streaming room data of the user account as the target program to the associated user account of the user account in response to detecting that the live streaming behavior meets the program acquisition condition.

Figure 8:
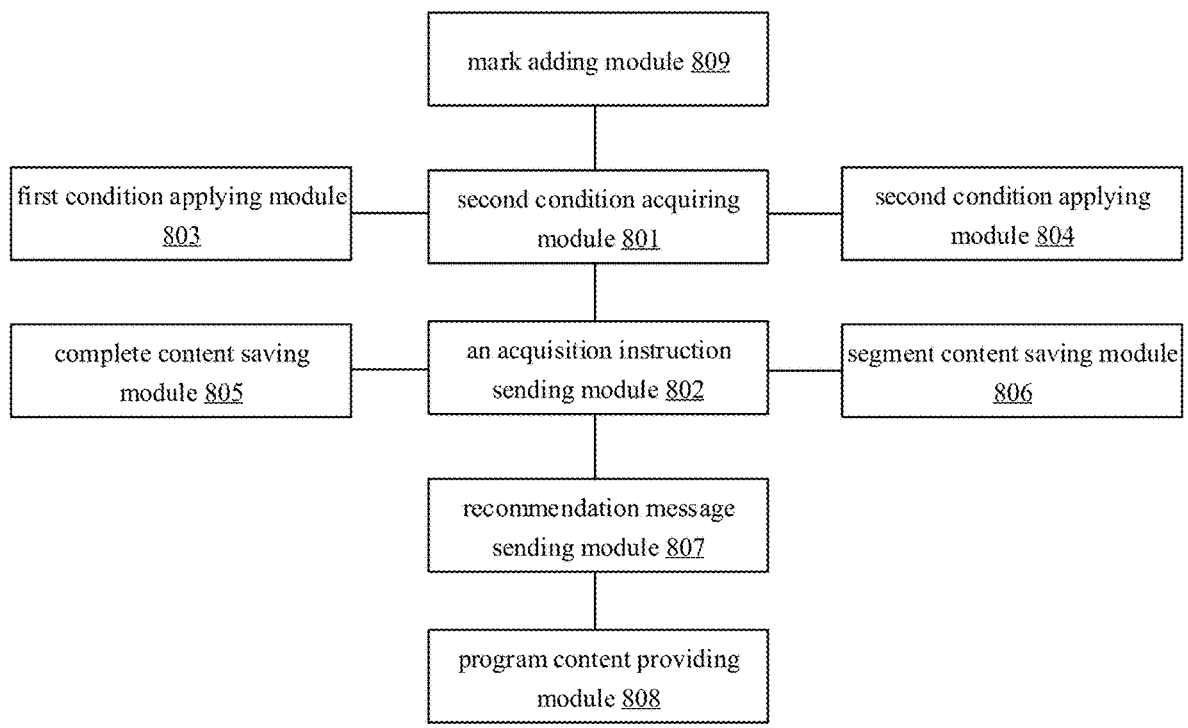
FIG. 8 is a schematic block diagram of an apparatus for acquiring programs in a live streaming room according to some arrangements of the disclosure.

FIG. 8 is a schematic block diagram of apparatus for acquiring programs in a live streaming room according to another arrangement of the disclosure. The apparatus for acquiring programs in a live streaming room shown in this arrangement may be applicable to the associated user account client of the webcast, and the associated user account client is applicable to the terminal. The terminal includes but not limited to mobile phones, tablets, and wearable devices, personal computers and other electronic devices. The user account client can be an application installed in the terminal, or a web version application integrated in the browser. The user can connect the server through the webcast client and enter the live streaming room to watch the live streaming program. The live streaming program can be a pure audio program, a pure video program, a video program containing audio signals, or an immersive program containing gravity, light, heat and other recognizable signals.

As shown in FIG. 8, the apparatus for acquiring programs in a live streaming room is applied to a server and may include:

a second condition acquiring module 801, configured to acquire a program acquisition condition; and an acquisition instruction sending module 802, configured to send a program acquisition instruction to an associated user account of a user account in response to detecting that a live streaming behavior of the user account meets the program acquisition condition. The program acquisition instruction is used to trigger the associated user account to save live streaming room data of the user account as the target program.

In some arrangements, the second condition acquiring module is further configured to:

receive a condition setting instruction issued by the user account or the associated user account of the user account;

determine the program acquisition condition based on the condition setting instruction.

In some arrangements, the apparatus further includes:

a first condition applying module 803, configured to apply the program acquisition condition to a live streaming program currently being broadcast in the live streaming room or all live streaming programs broadcast by the user account, in response to determining that the condition setting instruction is issued by the user account;

a second condition applying module 804, configured to apply the program acquisition condition to a live streaming program currently being broadcast in the live streaming room, all live streaming programs broadcast by the user account, or all live streaming programs received by the associated user account, in response to determining that the condition setting instruction is issued by the associated user account of the user account.

In some arrangements, the live streaming behavior includes a live streaming voice, the acquisition instruction sending module is further configured to detect that the live streaming voice of the user account meets the program acquisition condition.

In some arrangements, the live streaming behavior includes a live streaming action, the acquisition instruction sending module is further configured to detect that the live streaming action of the user account meets the program acquisition condition.

In some arrangements, the program acquisition condition includes a program acquisition start condition and a program acquisition end condition, the program acquisition instruction includes a program acquisition start instruction and a program acquisition end instruction, and the acquisition instruction sending module is further configured to:

send the program acquisition start instruction to the associated user account of the user account in response to detecting that the live streaming behavior of the user account meets the program acquisition start condition;

send the program acquisition end instruction to the associated user account of the user account in response to detecting that the live streaming behavior of the user account meets the program acquisition end condition.

In some arrangements, the apparatus further includes:

a complete content saving module 805, configured to save a complete program content corresponding to the live streaming room data of the user account; or, a segment content saving module 806, configured to save a segment program content corresponding to the target program in the complete program content corresponding to the live streaming room data of the user account. A start moment of the segment program content is a moment in response to determining that the live streaming behavior of the user account meets the program acquisition start condition, and an end moment of the segment program content is an moment in response to determining that the live streaming behavior of the user account meets the program acquisition end condition.

In some arrangements, the apparatus further includes:

a recommendation message sending module 807, configured to send a recommendation message of the target program to a client corresponding to the associated user account that is not online when the target program is in an on-air state, and/or to a client corresponding to the associated user account whose automatic download function is in an off state when the target program is in the on-air state;

a program content providing module 808, configured to provide the complete program content or the fragment program content to the associated user account in response to receiving a returned response message.

In some arrangements, the apparatus further includes:

a mark adding module 809, configured to add an automatic acquisition enabling mark to any associated user account of the user account in response to receiving an automatic acquisition enabling instruction sent by the any associated user account.

The acquisition instruction sending module is further configured to send the program acquisition instruction to the associated user account to which the automatic acquisition enabling mark is added.

The arrangement of the disclosure further proposes a client, including:

a processor; and a memory for storing executable instructions of the processor.

The processor is configured to execute the instructions to implement the method for acquiring programs in a live streaming room as described in any of the foregoing user account client side arrangements.

The arrangement of the disclosure further proposes a server, including:

a processor; and a memory for storing executable instructions of the processor.

The processor is configured to execute the instructions to implement the method for acquiring programs in a live streaming room as described in any server side arrangement described above.

The arrangement of the disclosure further proposes a storage medium. The instructions in the storage medium, when executed by a processor of an electronic device, enables the electronic device to execute any method for acquiring programs in a live streaming room as described in the user account client side and the server side arrangements.

Figure 9:
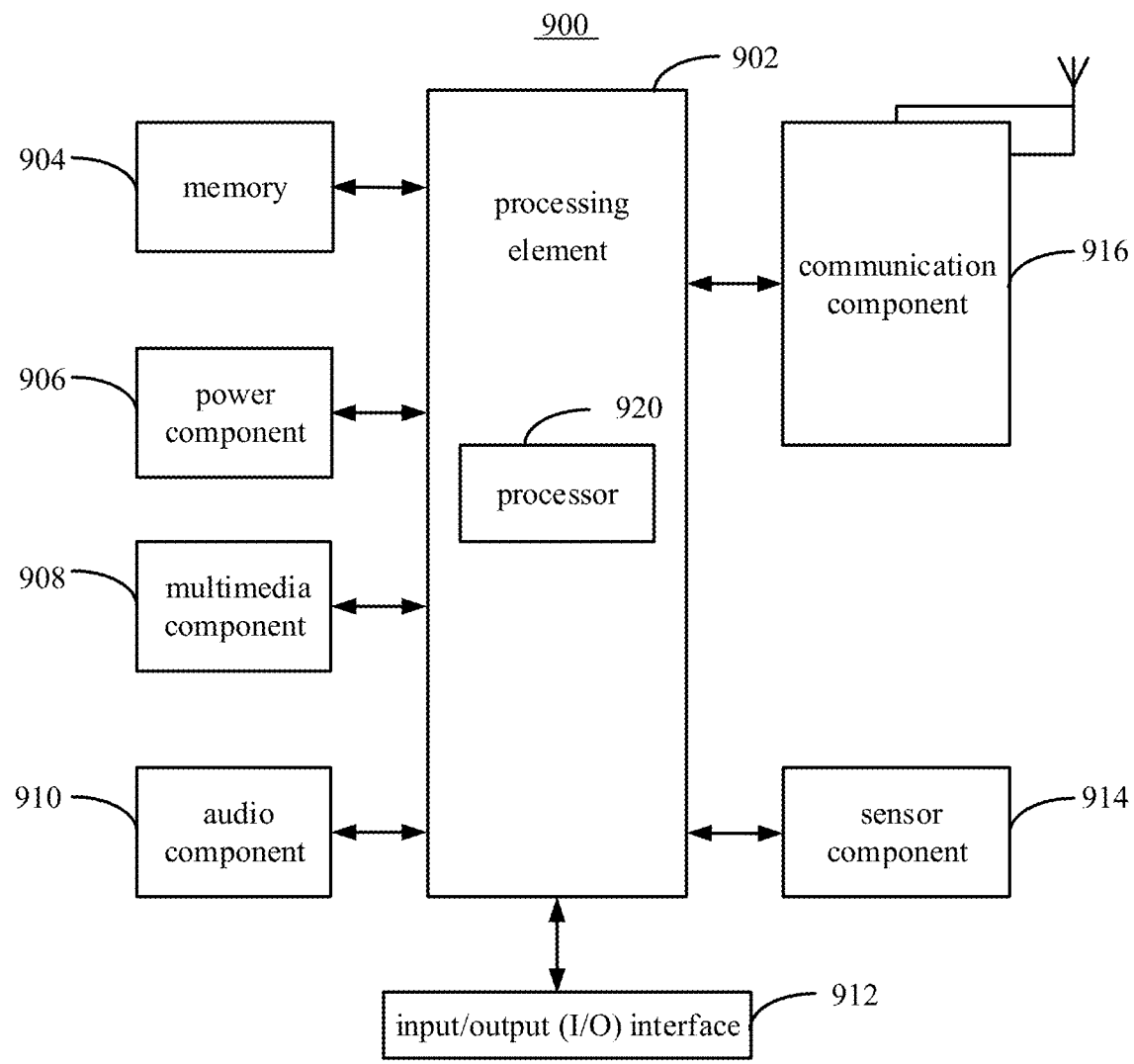
FIG. 9 is a structural diagram of an electronic device according to some arrangements of the disclosure.

FIG. 9 is a schematic block diagram showing an electronic device according to one of the arrangements of the disclosure. For example, the electronic device 900 may be a server in the form of a personal computer, an industrial computer, or an industrial personal computer.

Referring to FIG. 9, the electronic device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the electronic device 900, such as the operations associated with display, telephone calls, data communications, camera operations, and recording operations. The processing component 902 can include one or more processors 920 to execute instructions to perform all or part of the steps in the method for acquiring programs in a live streaming room at the user account client side described above. Moreover, the processing component 902 can include one or more modules to facilitate the interaction between the processing component 902 and other components. For example, the processing component 902 can include a multimedia module to facilitate the interaction between the multimedia component 908 and the processing component 902.

The memory 904 is configured to store various types of data to support the operation of the electronic device 900. Examples of such data include instructions for any application or method operated on the electronic device 900, such as the contact data, the phone book data, messages, pictures, videos, and the like. The memory 904 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the electronic device 900. The power component 906 can include a power management system, one or more power sources, and other components associated with the generation, management, and distribution of power in the electronic device 900.

The multimedia component 908 includes a screen providing an output interface between the electronic device 900 and the user. In some arrangements, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some arrangements, the multimedia component 908 includes a front camera and/or a rear camera. When the electronic device 900 is in an operation mode, such as a photographing mode or a video mode, the front camera and/or the rear camera can receive external multimedia data. Each of the front camera and the rear camera may be a fixed optical lens system or have focus and optical zoom capability.

The audio component 910 is configured to output and/or input an audio signal. For example, the audio component 910 includes a microphone (MIC) configured to receive an external audio signal when the electronic device 900 is in an operation mode, such as a call mode, a recording mode, and a voice recognition mode. The received audio signal may be further stored in the memory 904 or sent via the communication component 916. In some arrangements, the audio component 910 also includes a speaker for outputting the audio signal.

The I/O interface 912 provides an interface between the processing component 902 and peripheral interface modules, such as a keyboard, a click wheel, buttons, and the like. These buttons may include, but not limited to, a home button, a volume button, a starting button, and a locking button.

The sensor component 914 includes one or more sensors for providing state assessments of various aspects of the electronic device 900. For example, the sensor component 914 can detect an open/closed state of the electronic device 900, relative positioning of components, such as the display and the keypad of the electronic device 900. The sensor component 914 can also detect a change in position of one component of the electronic device 900 or the electronic device 900, the presence or absence of user contact with the electronic device 900, an orientation, or an acceleration/deceleration of the electronic device 900, and a change in temperature of the electronic device 900. The sensor component 914 can also include a proximity sensor configured to detect the presence of nearby objects without any physical contact. The sensor component 914 can also include a light sensor, such as a CMOS or CCD image sensor, configured to use in imaging applications. In some arrangements, the sensor component 914 can also include an accelerometer sensor, a gyroscope sensor, a magnetic sensor, a pressure sensor, or a temperature sensor.

The communication component 916 is configured to facilitate wired or wireless communication between the electronic device 900 and other devices. The electronic device 900 can access a wireless network based on a communication standard, such as Wi-Fi, service providers (2G; 3G; 4G or 5G) or a combination thereof. In an example arrangement, the communication component 916 receives broadcast signals or broadcast associated information from an external broadcast management system via a broadcast channel. In an example arrangement, the communication component 916 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an example arrangement, the electronic device 900 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the method for acquiring programs in a live streaming room at the user account client side described above.

In an example arrangement, there is also provided a non-transitory computer-readable storage medium including instructions, such as a memory 904 including instructions executable by the processor 920 of the electronic device 900 to perform the above method for acquiring programs in a live streaming room. For example, the non-transitory computer readable storage medium may be a ROM, a random access memory (RAM), a CD-ROM, a magnetic tape, a floppy disc, and an optical data storage device, or the like.

Figure 10:
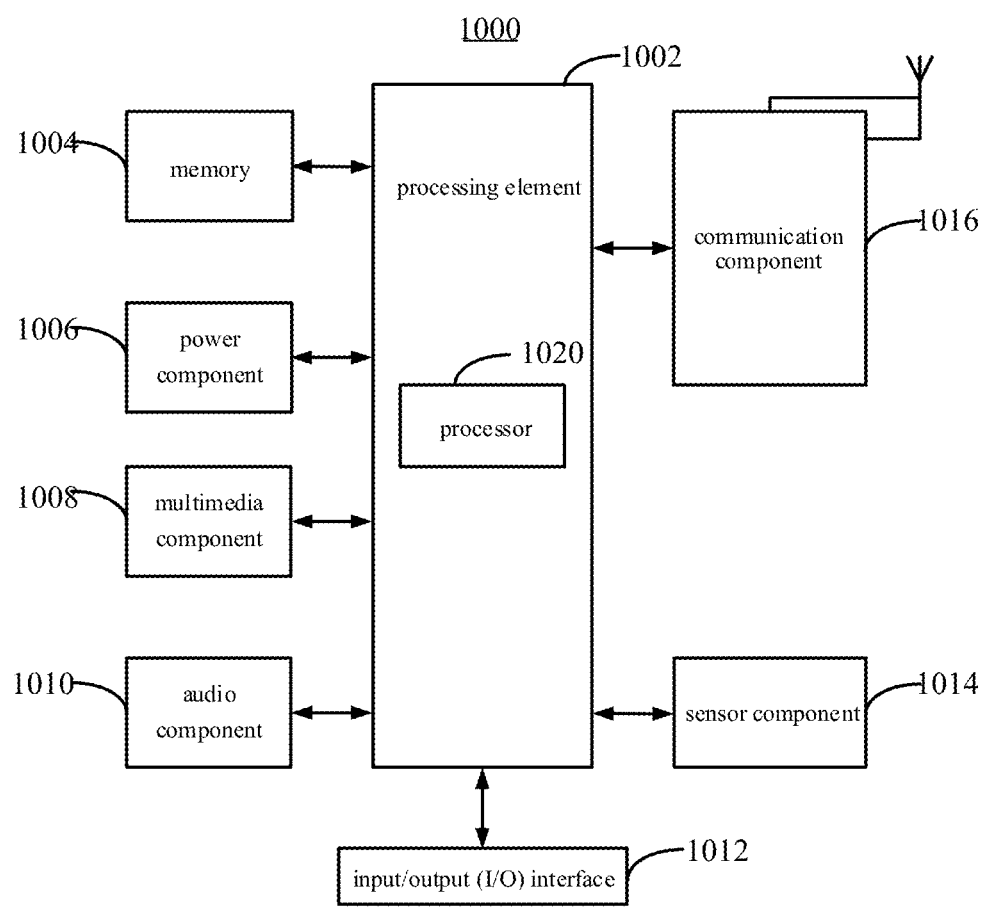
FIG. 10 is a structural diagram of an electronic device according to some arrangements of the disclosure.

FIG. 10 is a schematic block diagram showing an electronic device according to another arrangement of the disclosure. For example, the electronic device 1000 may be a mobile phone, a computer, a digital broadcasting terminal, a messaging device, a game console, a tablet device, a medical device, a fitness device, and a personal digital assistant or the like.

Referring to FIG. 10, the electronic device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the electronic device 1000, such as the operations associated with display, telephone calls, data communications, camera operations, and recording operations. The processing component 1002 can include one or more processors 1020 to execute instructions to perform all or part of the steps in the method for acquiring programs in a live streaming room at the server side described above. Moreover, the processing component 1002 can include one or more modules to facilitate the interaction between the processing component 1002 and other components. For example, the processing component 1002 can include a multimedia module to facilitate the interaction between the multimedia component 1008 and the processing component 1002.

The memory 1004 is configured to store various types of data to support the operation of the electronic device 1000. Examples of such data include instructions for any application or method operated on the electronic device 1000, such as the contact data, the phone book data, messages, pictures, videos, and the like. The memory 1004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the electronic device 1000. The power component 1006 can include a power management system, one or more power sources, and other components associated with the generation, management, and distribution of power in the electronic device 1000.

The multimedia component 1008 includes a screen providing an output interface between the electronic device 1000 and the user. In some arrangements, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some arrangements, the multimedia component 1008 includes a front camera and/or a rear camera. When the electronic device 1000 is in an operation mode, such as a photographing mode or a video mode, the front camera and/or the rear camera can receive external multimedia data. Each of the front camera and the rear camera may be a fixed optical lens system or have focus and optical zoom capability.

The audio component 1010 is configured to output and/or input an audio signal. For example, the audio component 1010 includes a microphone (MIC) configured to receive an external audio signal when the electronic device 1000 is in an operation mode, such as a call mode, a recording mode, and a voice recognition mode. The received audio signal may be further stored in the memory 1004 or sent via the communication component 1016. In some arrangements, the audio component 1010 also includes a speaker for outputting the audio signal.

The I/O interface 1012 provides an interface between the processing component 1002 and peripheral interface modules, such as a keyboard, a click wheel, buttons, and the like. These buttons may include, but not limited to, a home button, a volume button, a starting button, and a locking button.

The sensor component 1014 includes one or more sensors for providing state assessments of various aspects of the electronic device 1000. For example, the sensor component 1014 can detect an open/closed state of the electronic device 1000, relative positioning of components, such as the display and the keypad of the electronic device 1000. The sensor component 1014 can also detect a change in position of one component of the electronic device 1000 or the electronic device 1000, the presence or absence of user contact with the electronic device 1000, an orientation, or an acceleration/deceleration of the electronic device 1000, and a change in temperature of the electronic device 1000. The sensor component 1014 can also include a proximity sensor configured to detect the presence of nearby objects without any physical contact. The sensor component 1014 can also include a light sensor, such as a CMOS or CCD image sensor, configured to use in imaging applications. In some arrangements, the sensor component 1014 can also include an accelerometer sensor, a gyroscope sensor, a magnetic sensor, a pressure sensor, or a temperature sensor.

The communication component 1016 is configured to facilitate wired or wireless communication between the electronic device 1000 and other devices. The electronic device 1000 can access a wireless network based on a communication standard, such as Wi-Fi, service providers (2G 3G 4G or 5G) or a combination thereof. In an example arrangement, the communication component 1016 receives broadcast signals or broadcast associated information from an external broadcast management system via a broadcast channel. In an example arrangement, the communication component 1016 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an example arrangement, the electronic device 1000 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the method for acquiring programs in a live streaming room at the server side described above.

In an example arrangement, there is also provided a non-transitory computer-readable storage medium including instructions, such as a memory 1004 including instructions executable by the processor 1020 of the electronic device 1000 to perform the above method for acquiring programs in a live streaming room. For example, the non-transitory computer readable storage medium may be a ROM, a random access memory (RAM), a CD-ROM, a magnetic tape, a floppy disc, and an optical data storage device, or the like.

A system for acquiring programs in a live streaming room includes:

the client as shown in FIG. 9 and the server as shown in FIG. 10. The method for acquiring programs in a live streaming room implemented by the system for acquiring programs in a live streaming room may be as shown in FIG. 4 or FIG. 5, which will not be repeated here.

After considering the specification and practicing the disclosure disclosed herein, those skilled in the art will easily think of other arrangements of the disclosure. The disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the arrangements are only regarded as example, and the true scope and spirit of the disclosure are pointed out by the following claims.

It should be understood that the disclosure is not limited to the precise structure that has been described above and shown in the drawings, and various modifications and changes can be made without departing from its scope. The scope of the disclosure is only limited by the appended claims.

It should be noted that in this article, relational terms such as first and second are only used to distinguish one entity or operation from another entity or operation, and do not necessarily require or imply any such actual relationship or order between these entities or operations. The terms "include", "include", or any other variants thereof are intended to cover non-exclusive inclusion, so that a process, method, article or device including a series of elements includes not only those elements, but also other elements that are not explicitly listed, or also include elements inherent to such processes, methods, articles, or devices. If there are no more restrictions, the element defined by the sentence "including a . . . " does not exclude the existence of other same elements in the process, method, article, or device that includes the element.

The methods and apparatuses provided by the arrangements of the disclosure are described in detail above. Specific examples are used in this article to illustrate the principles and implementations of the disclosure. The description of the above arrangements is only used to help understand the methods and core ideas of the disclosure. At the same time, for those of ordinary skill in the art, according to the ideas of the disclosure, there will be changes in the specific implementation and the scope of application. In summary, the content of this specification should not be construed as limiting the disclosure.

What is claimed is:

1. A method for acquiring programs of a live streaming room, comprising:
    acquiring a program acquisition condition; and
    saving live streaming room data of a user account as a target program in response to detecting that a live streaming behavior of the user account meets the program acquisition condition, to provide the target program to an associated user account of the user account,
    wherein the live streaming behavior comprises a live streaming action,
    said detecting that the live streaming behavior of the user account meets the program acquisition condition comprises: detecting that the live streaming action of the user account meets the program acquisition condition.

2. The method according to claim 1, wherein said acquiring the program acquisition condition comprises:
    receiving a condition setting instruction issued by the user account or the associated user account; and
    determining the program acquisition condition based on the condition setting instruction.

3. The method according to claim 1, wherein the live streaming behavior comprises a live streaming voice,
    said detecting that the live streaming behavior of the user account meets the program acquisition condition comprises: detecting that the live streaming voice of the user account meets the program acquisition condition.

4. The method according to claim 1, wherein the program acquisition condition comprises a program acquisition start condition and a program acquisition end condition, and said saving live streaming room data of the user account as the target program in response to detecting that the live streaming behavior of the user account meets the program acquisition condition comprises:
    triggering to start saving the live streaming room data of the user account as the target program in response to detecting that the live streaming behavior of the user account meets the program acquisition start condition; and
    triggering to stop saving the live streaming room data of the user account as the target program in response to detecting that the live streaming behavior of the user account meets the program acquisition end condition.

5. The method according to claim 4, further comprising:
    triggering to serve a moment as a saving start moment to recalculate a storage duration of the live streaming room data, in response to detecting that the live streaming behavior meets the program acquisition start condition again at the moment, after start of saving the live streaming room data is triggered.

6. The method according to claim 1, wherein said saving live streaming room data of the user account as the target program comprises:
    triggering a client corresponding to the user account to save the live streaming room data of the user account as the target program; or,
    sending the program acquisition instruction to a server, to trigger the server to save the live streaming room data of the user account as the target program; or,
    sending a program acquisition instruction to the server, such that the server forwards the program acquisition instruction to the associated user account, wherein the program acquisition instruction is used to trigger a client corresponding to the associated user account to save the live streaming room data of the user account as the target program.

7. The method according to claim 1, wherein said providing the target program to the associated user account of the user account comprises:
    sending the target program to the associated user account; or,
    sending a recommendation message of the target program to a client corresponding to the associated user account that is not online when the target program is in an on-air state, or to a client corresponding to the associated user account whose automatic download function is in an off state when the target program is in the on-air state, or to both the client corresponding to the associated user account that is not online when the target program is in an on-air state and the client corresponding to the associated user account whose automatic download function is in an off state when the target program is in the on-air state; and providing a complete program content or a fragment program content to the associated user account in response to receiving a returned response message.

8. The method according to claim 1, further comprising:
    sending the program acquisition condition to a server, such that the server sends a program acquisition instruction of saving the live streaming room data of the user account as the target program to the associated user account of the user account in response to detecting that the live streaming behavior meets the program acquisition condition.

9. An apparatus for acquiring programs of a live streaming room, comprising:
    a processor; and
    a memory for storing executable instructions of the processor,
    wherein the processor is configured to:
    acquire a program acquisition condition; and
    save live streaming room data of a user account as a target program in response to detecting that a live streaming behavior of the user account meets the program acquisition condition, to provide the target program to an associated user account of the user account,
    wherein the live streaming behavior comprises a live streaming action,
    the processor is further configured to detect that the live streaming action of the user account meets the program acquisition condition.

10. The apparatus according to claim 9, wherein the processor is further configured to:
    receive a condition setting instruction issued by the user account or the associated user account; and
    determine the program acquisition condition based on the condition setting instruction.

11. The apparatus according to claim 9, wherein the live streaming behavior comprises a live streaming voice, the processor is further configured to detect that the live streaming voice of the user account meets the program acquisition condition.

12. The apparatus according to claim 9, wherein the program acquisition condition comprises a program acquisition start condition and a program acquisition end condition, and the processor is further configured to:

trigger to start saving the live streaming room data of the user account as the target program in response to detecting that the live streaming behavior of the user account meets the program acquisition start condition; and trigger to stop saving the live streaming room data of the user account as the target program in response to detecting that the live streaming behavior of the user account meets the program acquisition end condition.

13. The apparatus according to claim 12, wherein the processor is further configured to:

trigger to serve a moment as a saving start moment to recalculate a storage duration of the live streaming room data, in response to detecting that the live streaming behavior meets the program acquisition start condition again at the moment, after start of saving the live streaming room data is triggered.

14. The apparatus according to claim 9, wherein the processor is further configured to:

trigger a client corresponding to the user account to save the live streaming room data of the user account as the target program; or, send the program acquisition instruction to a server, to trigger the server to save the live streaming room data of the user account as the target program; or, send a program acquisition instruction to the server, such that the server forwards the program acquisition instruction to the associated user account, wherein the program acquisition instruction is used to trigger a client corresponding to the associated user account to save the live streaming room data of the user account as the target program.

15. The apparatus according to claim 9, wherein the processor is further configured to:

send the target program to the associated user account; or, send a recommendation message of the target program to a client corresponding to the associated user account that is not online when the target program is in an on-air state, or to a client corresponding to the associated user account whose automatic download function is in an off state when the target program is in the on-air state, or to both the client corresponding to the associated user account that is not online when the target program is in an on-air state and the client corresponding to the associated user account whose automatic download function is in an off state when the target program is in the on-air state; and provide a complete program content or a fragment program content to the associated user account in response to receiving a returned response message.

16. The apparatus according to claim 9, wherein the processor is further configured to:

send the program acquisition condition to a server, such that the server sends a program acquisition instruction of saving the live streaming room data of the user account as the target program to the associated user account of the user account in response to detecting that the live streaming behavior meets the program acquisition condition.

17. A system for acquiring programs in a live streaming room, comprising:

a client; and a server, wherein the client is configured to:

acquire a first program acquisition condition; and save live streaming room data of a user account as a target program in response to detecting that a live streaming behavior of the user account meets the first program acquisition condition, to provide the target program to an associated user account of the user account, wherein the live streaming behavior comprises a live streaming action, the client is further configured to detect that the live streaming action of the user account meets the first program acquisition condition, the server is configured to:

acquire a second program acquisition condition; and send a program acquisition instruction to an associated user account of a user account in response to detecting that a live streaming behavior of the user account meets the second program acquisition condition, wherein the program acquisition instruction is used to trigger the associated user account to save live streaming room data of the user account as the target program.

18. The system according to claim 17, wherein said acquiring the first program acquisition condition comprises:

receiving a condition setting instruction issued by the user account or the associated user account; and determining the first program acquisition condition based on the condition setting instruction.

* * * * *